United States Patent
Lindoff et al.

(10) Patent No.: US 9,490,923 B2
(45) Date of Patent: Nov. 8, 2016

(54) DETECTION OF TIME DIVISION DUPLEX DOWNLINK/UPLINK CONFIGURATION

(71) Applicant: TELEFONAKTIEBOLAGET L M ERICSSON (publ), Stockholm (SE)

(72) Inventors: Bengt Lindoff, Bjarred (SE); Muhammad Ali Kazmi, Bromma (SE); Johan Nilsson, Hollviken (SE); David Astely, Bromma (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/639,050

(22) Filed: Mar. 4, 2015

(65) Prior Publication Data

US 2015/0236804 A1 Aug. 20, 2015

Related U.S. Application Data

(63) Continuation of application No. 12/141,053, filed on Jun. 17, 2008, now Pat. No. 9,001,791.

(60) Provisional application No. 61/025,072, filed on Jan. 31, 2008.

(51) Int. Cl.
 *H04B 17/318* (2015.01)
 *H04W 36/00* (2009.01)
 *H04W 48/16* (2009.01)

(52) U.S. Cl.
 CPC ....... *H04B 17/318* (2015.01); *H04W 36/0083* (2013.01); *H04W 48/16* (2013.01)

(58) Field of Classification Search
 CPC ........... H04W 36/0083; H04W 36/16; H04W 36/30; H04W 40/12; H04W 48/16; H04L 25/0238; H04L 25/024; H04B 17/0045; H04B 17/0057; H04B 17/318
 See application file for complete search history.

(56) References Cited

U.S. PATENT DOCUMENTS

| 8,498,599 B2 | 7/2013 | Lindoff et al. |
| 2003/0086384 A1 | 5/2003 | Kwon et al. |

(Continued)

FOREIGN PATENT DOCUMENTS

| JP | 2006-518571 A | 8/2006 |
| JP | 2007-221743 A | 8/2007 |

(Continued)

OTHER PUBLICATIONS

3GPP Technical Report TR 25.814, V7.0.0, Physical Layer Aspects for Evolved Universal Terrestrial Radio Access (UTRA), Release 7, Jun. 2006, Section 7.1.1.2.2.

(Continued)

*Primary Examiner* — Un C Cho
*Assistant Examiner* — Jeremy Costin
(74) *Attorney, Agent, or Firm* — Leffler Intellectual Property Law, PLLC

(57) ABSTRACT

A user equipment (UE) in a cellular telecommunications system is able to detect the uplink/downlink configuration of a detected neighboring cell by receiving a signal from the neighboring cell. A characteristic of the received signal is detected and used as an indicator in a blind detection process to identify one or more downlink slots in the received signal. Known pilot signals in the identified one or more downlink slots can then be used to obtain a signal power measurement of the received signal. The blind detection process is also capable of detecting whether a slot of a neighboring cell's signal is a downlink unicast slot or a Multicast-Broadcast Single Frequency Network slot.

8 Claims, 17 Drawing Sheets

(56) References Cited

U.S. PATENT DOCUMENTS

| | | | |
|---|---|---|---|
| 2003/0125040 A1 | 7/2003 | Walton et al. |
| 2005/0063339 A1 | 3/2005 | Jeong et al. |
| 2006/0068800 A1 | 3/2006 | Ruelke et al. |
| 2007/0066220 A1 | 3/2007 | Proctor, Jr. et al. |
| 2007/0115899 A1 | 5/2007 | Ovadia et al. |
| 2007/0280098 A1 | 12/2007 | Bhatt et al. |
| 2008/0031368 A1 | 2/2008 | Lindoff et al. |
| 2008/0101488 A1 | 5/2008 | Wilhelmsson et al. |
| 2008/0260062 A1 | 10/2008 | Imamura |
| 2009/0010196 A1 | 1/2009 | Bui et al. |
| 2009/0175179 A1 | 7/2009 | Stewart et al. |
| 2009/0275356 A1 | 11/2009 | Chapman et al. |
| 2010/0061345 A1 | 3/2010 | Wengerter et al. |
| 2010/0296429 A1 | 11/2010 | Han et al. |

FOREIGN PATENT DOCUMENTS

| | | |
|---|---|---|
| WO | 2007073093 A2 | 6/2007 |
| WO | 2009/088734 A1 | 7/2009 |

OTHER PUBLICATIONS

3GPP Technical Specification TS 36.211 V8.1.0, Physical Channels and Modulation, Release 8, Nov. 2007, Sections 6.10 and 6.11.

International Preliminary Report on Patentability, mailed Aug. 12, 2010, in connection with International Application No. PCT/EP2009/050834, all pages.

3GPP TS 36.214 V8.0.0: Technical Specification Group Radio Access Network; (E-EUTRA); Physical layer; Measurements Third Generation Partnership Project, Sep. 12, 2007, pp. 1-11, XP002523418 Sophia Antipolis, France.

3GPP TS 36.211 V8.0.0: Technical Specification Group Radio Access Network; Evolved Universal Terrestrial Radio Access (E-UTRA); Physical channels and modulation (Release 8) Internet Citation, Sep. 12, 2007, XP002520076.

Anas, M. et al: "Performance Analysis of Handover Measurements and Layer 3 Filtering for Utran LTE" IEEE International Symposium on Personal, Indoor and Mobile Radio Communications. PIMRC, IEEE; PI, XX, Sep. 1, 2007, pp. 1-5, XP031168749, ISBN: 978-1-4244-1143-6.

Ericsson: "Reference Signal Received Quality, RSRQ, measurement" Third Generation Partnership Project; Technical Specification Group (TSG) Radio Access Network (RAN); Working Group 1 (WG1), XX, XX #49Bis; 20070625-20070629, [Online] No. R1-073041, pp. 1-2, XP002490044. Retrieved from the Internet: URL: http://www.3gpp.org/ftp/tsg%5FranWG1%5FRL1/TSGR1%5F49b/Docs/R1-073041.z> [retrieved on Jul. 29, 2008].

PCT International Search Report, mailed Apr. 24, 2009, in connection with International Application No. PCT/EP2009/050834, all pages.

PCT Written Opinion, mailed Apr. 24, 2009, in connection with International Application No. PCT/EP2009/050834, all pages.

Chinese Search Report, dated Nov. 20, 2012, in connection with counterpart Chinese Patent Application No. 200980104308.8, all pages.

Australian Examination Report, dated Nov. 16, 2012, in connection with counterpart Australian Patent Application No. 2009209693, all pages.

Japanese Decision to Grant, mailed Jul. 17, 2013, in connection with counterpart Japanese Patent Application No. 2010-544673 (with translation), all pages.

Canadian Office Action, mailed Jul. 7, 2015, in connection with Canadian Application No. 2,711,577, all pages.

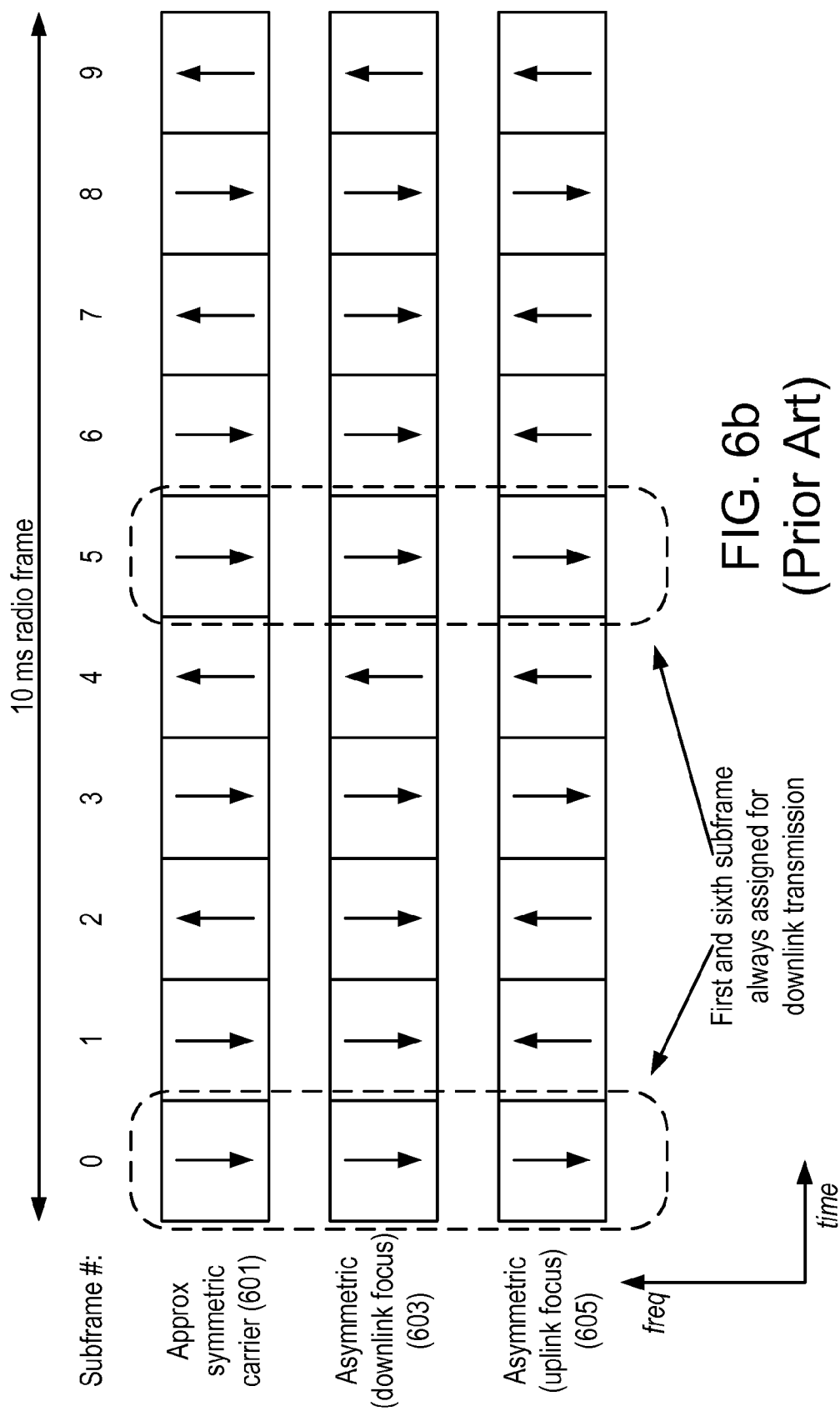

DETECTION OF TIME DIVISION DUPLEX DOWNLINK/UPLINK CONFIGURATION

CROSS REFERENCE TO RELATED APPLICATIONS

This application claims the benefit of U.S. application Ser. No. 12/141,053, filed Jun. 17, 2008, which claims the benefit of U.S. Provisional Application No. 61/025,072, filed Jan. 31, 2008, which applications are hereby incorporated herein by reference in their entireties.

BACKGROUND

The present invention relates to cellular telecommunications, more particularly to cellular telecommunications employing both full frequency duplex (FDD) transmissions and time division duplex (TDD) transmissions, and even more particularly to methods and apparatuses that, inter alia, enable a user equipment (UE) to determine whether the transmissions of a neighboring cell are uplink or downlink transmissions.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high capacity high data rate system in existing radio spectrum, a new system has to be able to utilize a bandwidth of varying size. A proposal for such a new flexible cellular system, called Third Generation Long Term Evolution (3G LTE), can be seen as an evolution of the 3G WCDMA standard. This system will use OFDM as the multiple access technique (called OFDMA) in the downlink and will be able to operate on bandwidths ranging from 1.4 MHz to 20 MHz. Furthermore, data rates up to and exceeding 100 Mb/s will be supported for the largest bandwidth. However, it is expected that 3G LTE will be used not only for high rate services, but also for low rate services like voice. Since 3G LTE is designed for Transmission Control Protocol/Internet Protocol (TCP/IP), Voice over IP (VoIP) will be the service that carries speech.

Transmissions from the system that are targeted to be received by a single user take place in what is termed a "unicast" mode of operation. Here, there is a single transmitter that communicates information to a single intended receiver. The LTE system is, however, additionally designed to support broadcast/multicast services, called Multimedia Broadcast/Multicast Service (MBMS).

The provisioning of broadcast/multicast services in a mobile communication system allows the same information to be simultaneously provided to multiple, often a large number of, mobile terminals, often dispersed over a large area corresponding to a large number of cells. FIG. 1 illustrates this point by showing a broadcast area 101 that comprises a number of cells 103. The broadcast/multicast information may be a TV news clip, information about the local weather conditions, stock-market information, or any other kind of information that, at a given time instant, may be of interest to a large number of users.

When the same information is to be provided to multiple mobile terminals within a cell it is often beneficial to provide this information as a single "broadcast" radio transmission covering the entire cell and simultaneously being received by all relevant mobile terminals rather than providing the information by means of individual transmissions to each mobile terminal (i.e., plural unicast transmissions).

As a broadcast transmission within a cell has to be dimensioned to operate under worst-case conditions (e.g., it needs to be able to reach mobile terminals at the cell border even though other mobile terminals may be quite close to the transmitter antenna), it can be relatively costly in terms of the resources (base station transmit power) needed to provide a given broadcast-service data rate. Alternatively, taking into account the limited signal-to-noise ratio that can be achieved at poor areas of reception within the cell (e.g. the cell edge), the achievable broadcast data rates may be relatively limited, especially when large cells are involved. One way to increase the broadcast data rates would then be to reduce the cell size, thereby increasing the power of the received signal at the cell's edge. However, such an approach would increase the number of cells needed to cover a certain area and would thus obviously be undesirable from a cost-of-deployment point-of-view.

However, as discussed above, the provisioning of broadcast/multicast services in a mobile communication network typically occurs when identical information is to be provided over a large number of cells. In such cases, the resources (e.g., base-station transmit power) needed to provide a desired broadcast data rate can be considerably reduced if, when detecting/decoding the broadcast data, mobile terminals at the cell edge can utilize the received power from multiple broadcast transmissions emanating from multiple cells.

One way to achieve this is to ensure that the broadcast transmissions from different cells are truly identical and transmitted mutually time-aligned. Under these conditions, the transmissions received by user equipment (UE) (e.g., a mobile terminal) from multiple cells will appear as a single transmission subject to severe multi-path propagation. The transmission of identical time-aligned signals from multiple cells, especially when utilized to provide broadcast/multicast services, is sometimes referred to as Single-Frequency-Network (SFN) operation or Multicast-Broadcast Single Frequency Network (MBSFN) operation.

When multiple cells transmit such identical time-aligned signals, the UE no longer experiences "inter-cell interference" from its neighbor cells, but instead experiences signal corruption due to time dispersion. If the broadcast transmission is based on OFDM with a cyclic prefix that covers the main part of this "time dispersion", the achievable broadcast data rates are thus only limited by noise, implying that, especially in smaller cells, very high broadcast data rates can be achieved. Furthermore, the OFDM receiver does not need to explicitly identify the cells to be soft combined. Rather, all cells whose transmissions fall within the cyclic prefix will "automatically" contribute to the power of the UE's received signal.

In each of the unicast and multicast modes, the LTE physical layer downlink transmission is based on OFDM. The basic LTE downlink physical resource can thus be seen as a time-frequency grid as illustrated in FIG. 2, in which each so-called "resource element" corresponds to one OFDM subcarrier during one OFDM symbol interval.

As illustrated in FIG. 3, the downlink subcarriers in the frequency domain are grouped into resource blocks, where each resource block consists of twelve consecutive subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c=12 \cdot N_{RB}+1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB\text{-}min}=6$ and upwards, corresponding to a nominal transmission bandwidth ranging from around 1.25 MHz up to 20 MHz. This allows for a very high degree of LTE bandwidth/spectrum flexibility, at least from a physical-layer-specification point-of-view.

FIGS. 4a and 4b illustrate the time-domain structure for LTE downlink transmission. Each 1 ms subframe 400 consists of two slots of length $T_{slot}=0.5$ ms ($=15360 \cdot T_S$, wherein each slot comprises 15,360 time units, $T_S$). Each slot then consists of a number of OFDM symbols.

A subcarrier spacing $\Delta f=15$ kHz corresponds to a useful symbol time $T_u=1/\Delta f \approx 66.7$ μs ($2048 \cdot T_S$). The overall OFDM symbol time is then the sum of the useful symbol time and the cyclic prefix length $T_{CP}$. Two cyclic prefix lengths are defined. FIG. 4a illustrates a normal cyclic prefix length, which allows seven OFDM symbols per slot to be communicated. The length of a normal cyclic prefix, $T_{CP}$, is $160 \cdot T_S \approx 5.1$ μs for the first OFDM symbol of the slot, and $144 \cdot T_S \approx 4.7$ μs for the remaining OFDM symbols.

FIG. 4b illustrates an extended cyclic prefix, which because of its longer size, allows only six OFDM symbols per slot to be communicated. The length of an extended cyclic prefix, $T_{CP\text{-}e}$, is $512 \cdot T_S \approx 16.7$ μs.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of $12 \cdot 7 = 84$ resource elements for the case of normal cyclic prefix (illustrated in FIGS. 3), and $12 \cdot 6 = 72$ resource elements for the case of the extended cyclic prefix (not shown).

Another important aspect of a terminal's operation is mobility, which includes cell search, synchronization, and signal power measurement procedures. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information on the broadcast channel, containing the remaining parameters required for accessing the system.

To avoid complicated cell planning, the number of physical layer cell identities should be sufficiently large. For example, systems in accordance with the LTE standards support 504 different cell identities. These 504 different cell identities are divided into 168 groups of three identities each.

In order to reduce the cell-search complexity, cell search for LTE is typically done in several steps that make up a process that is similar to the three-step cell-search procedure of WCDMA. To assist the terminal in this procedure, LTE provides a primary synchronization signal and a secondary synchronization signal on the downlink. This is illustrated in FIG. 5, which illustrates the structure of the radio interface of an LTE system. The physical layer of an LTE system includes a generic radio frame 500 having a duration of 10 ms. FIG. 5 illustrates one such frame 500 for an LTE Frequency Division Duplex (FDD) system. Each frame has 20 slots (numbered 0 through 19), each slot having a duration of 0.5 ms which normally consists of seven OFDM symbols. A subframe is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. In addition to the synchronization signals, part of the operation of the cell search procedure also exploits reference signals that are transmitted at known locations in the transmitted signal.

Furthermore, LTE is defined to be able to operate in both FDD mode as well as in Time Division Duplex (TDD) mode. Within one carrier, the different subframes of a frame can either be used for downlink transmission of for uplink transmission. FIG. 6a illustrates the case for FDD operation, wherein pairs of the radiofrequency spectrum are allocated to users, one part for uplink transmissions, and the other part for downlink transmissions. In this operation, all subframes of a carrier are used for either downlink transmission (a downlink carrier) or for uplink transmission (an uplink carrier).

By comparison, FIG. 6b illustrates the case for TDD operation. It will be observed that in this operation, the first and sixth subframe of each frame (i.e., subframes 0 and 5) are always assigned for downlink transmission, while the remaining subframes can be flexibly assigned to be used for either downlink or uplink transmission. The reason for the predefined assignment of the first and sixth subframe for downlink transmission is that these subframes include the LTE synchronization signals. The synchronization signals are transmitted on the downlink of each cell and, as explained earlier, are intended to be used for initial cell search as well as for neighbor-cell search.

FIG. 6b also illustrates the flexibility that LTE provides in assigning uplink and downlink subframes during TDD operation. This flexibility allows for different asymmetries in terms of the amount of radio resources (subframes) assigned for downlink and uplink transmission, respectively. For example, an approximately symmetric carrier 601 can be created, as can an asymmetric carrier with a downlink focus 603 (i.e., more downlink subframes than uplink subframes), and an asymmetric carrier with an uplink focus 605 (i.e., more uplink subframes than downlink subframes).

As the subframe assignment needs to be the same for neighbor cells in order to avoid severe interference between downlink and uplink transmissions between the cells, the downlink/uplink asymmetry cannot vary dynamically on, for example, a frame-by-frame basis. However, it can be changed on a slower basis to, for example, match different traffic characteristics such as differences and variations in the downlink/uplink traffic asymmetry.

In LTE, a measure of the Reference Signal Received Power RSRP is used for handover measurements. This means that the mobile terminal needs to measure RSRP on the serving cell as well as on those neighboring cells that have been detected by the cell search. RSRP is defined as the average signal power of the Node B's transmitted (i.e., downlink) Reference Symbols or Signals (RS). The RSs are transmitted from the Node B from each of possibly 1, 2 or 4 transmit antennas, on certain resource elements (RE) in the time-frequency grid. For example, in LTE the resource elements are transmitted on every sixth subcarrier in OFDM symbol number 0 and in either symbol number 3 (when long CPs are used) or symbol number 4 (when short CPs are used) in every slot (consisting of either 6 or 7 OFDM symbols, depending on whether long or short CPs are being used). Furthermore, the RS in symbol number 3/4 is offset by three subcarriers relative to the RS in the first OFDM symbol.

In order to arrive at an RSRP measurement that is truly representative of the signal conditions, the UE needs to average a number of measurements obtained over a number of slots (and subframes). For FDD operation, this can easily be done because the downlink and uplink transmissions occur on separate carriers, and hence all subframes of the downlink carriers can be used for generating an RSRP estimate.

However, for TDD operation, the uplink and downlink transmissions share the same carrier frequency, so not all of the subframes can be used. To complicate matters, the uplink/downlink configuration for different neighboring cells could—in the general case—be different. The uplink/downlink configuration of a newly detected cell (i.e., a cell that has just been detected as a potential handover candidate by the cell search procedure) is, at the time of detection, unknown to the UE. This information is conventionally first made known to the UE at the time of handover to that cell.

Accordingly, the UE is conventionally required to rely on RSs transmitted in only those subframes that are guaranteed to be associated with downlink transmissions (e.g., synchronization subframes 0 and 5 in LTE, as illustrated in FIG. 6b). Being limited to the RSs from only these slots results in a noisy RSRP (or similar) measurement, so longer averaging time is needed to generate a useful value, thereby delaying the handover procedure.

However, in a typical TDD uplink/downlink configuration, there are more downlink subframes than just the synchronization subframes. A super-frame in LTE is 10 ms divided into ten 1 ms subframes, two of which are sync subframes (see, e.g., FIG. 5). Typically, the uplink/downlink configuration is 40/60 or even 30/70, so there are actually more downlink subframes (and hence more RSs) available than just the RSs included in the synchronization subframes (corresponding to a downlink/uplink allocation of 20/80).

Therefore there is a need for methods and apparatuses that are able to detect the uplink/downlink configuration in TDD operation for neighboring cells at the time those cells are first detected, in order to improve the RSRP (or similar) measurement performance.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operating a user equipment (UE) in a cellular telecommunications system. Such operation includes receiving a signal from a neighboring cell and detecting a characteristic of the received signal. The detected characteristic is used as an indicator in a blind detection process to identify one or more downlink slots in the received signal. Known pilot signals in the identified one or more downlink slots are then used to obtain a signal power measurement of the received signal.

In some embodiments, the detected characteristic is a detected frequency domain power profile, and the blind detection process comprises comparing the detected frequency domain power profile with at least one of a nominal downlink power profile and a nominal uplink power profile.

In alternative embodiments, the detected characteristic is a detected received signal strength indicator (RSSI), and the blind detection process comprises, for each of one or more OFDM symbols, comparing the detected RSSI with at least one of a nominal downlink RSSI power profile and a nominal uplink RSSI power profile.

In still other alternative embodiments, the detected characteristic is a detected information content of resource elements of the received signal known to be reference symbol resource elements in a downlink subframe, wherein each resource element is defined by subcarrier frequency and time of occurrence; and the blind detection process comprises correlating the detected information content with information content of one or more known reference symbols.

In still other alternative embodiments, the detected characteristic is a detected automatic gain control setting used to receive the received signal; and the blind detection process comprises comparing the detected automatic gain control setting with an automatic gain control setting of a known downlink slot.

The various blind detection processes are also useful for identifying whether a slot of a neighboring cell's signal is a downlink unicast slot or a Multicast-Broadcast Single Frequency Network slot. With this knowledge, a user equipment can use known pilot signals in the identified one or more downlink unicast slots to obtain a signal power measurement of the received signal. In some, but not necessarily all, embodiments, the user equipment can additionally use cell-specific pilot signals in Multicast-Broadcast Single Frequency Network slots to obtain the signal power measurement of the received signal.

BRIEF DESCRIPTION OF THE DRAWINGS

The objects and advantages of the invention will be understood by reading the following detailed description in conjunction with the drawings in which:

FIG. 6b illustrates a signal timing diagram for the case of TDD operation.

DETAILED DESCRIPTION

Figure 1:
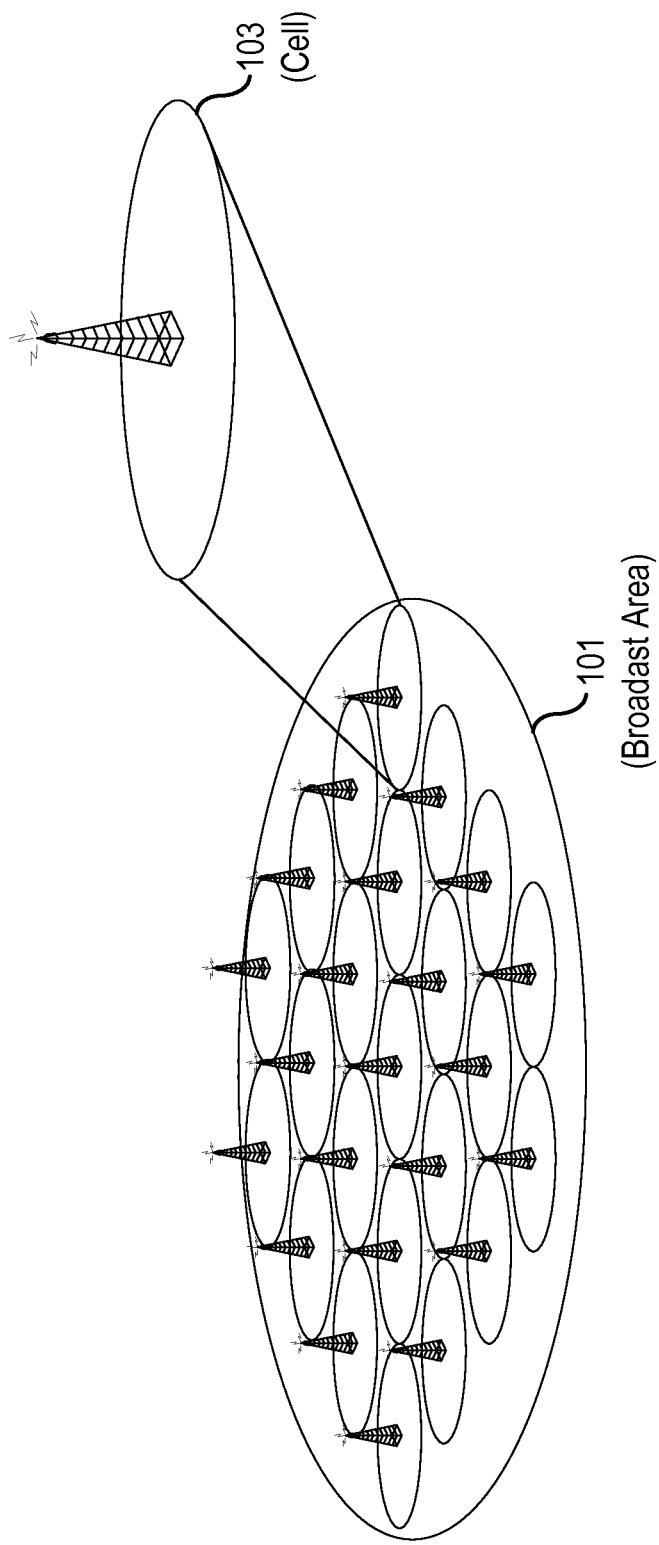
FIG. 1 illustrates a broadcast area that comprises a number of telecommunication system cells.
Figure 2:
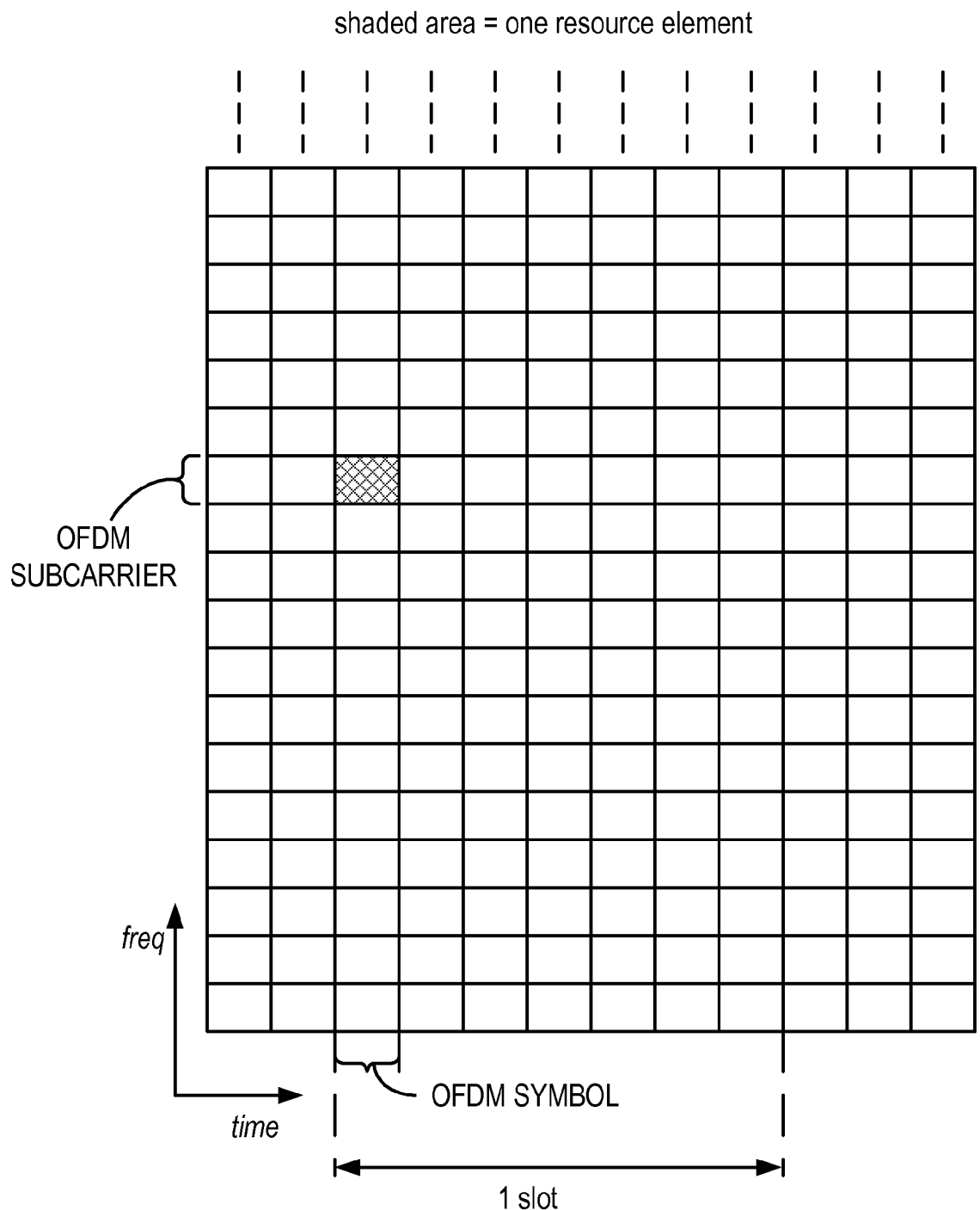
FIG. 2 illustrates a time-frequency grid an exemplary LTE downlink physical resource ("resource element") that corresponds to one OFDM subcarrier during one OFDM symbol interval.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of embodiments consistent with the invention, a blind detection process is used to detect the uplink/downlink configuration of a detected neighboring cell. Different embodiments utilize knowledge that the uplink transmission technology differs from that of downlink transmissions. For example, in an LTE system, uplink transmissions utilize Single-Carrier FDMA (SC-FDMA), whereas downlink transmissions rely on OFDM. This means that the signals associated with uplink slots (and subframes) will differ from those associated with downlink slots (and subframes). Hence, the UE can for example distinguish between uplink and downlink transmissions by correlating a received signal's frequency domain power profile (per sub-carrier and OFDM symbol) to a typical frequency domain power profile pattern of a downlink transmission to detect whether the slot/subframe is uplink or downlink.

In an alternative embodiment, correlation only to the average power profile per OFDM symbol (over subframe) is made.

In yet another embodiment, correlation to the potential positions of downlink RSs can be done in order to detect the DL subframes.

In yet another embodiment, AGC settings in the front end receiver can be used for detection of UL and DL subframes.

Once the uplink/downlink configuration of the detected cell has been detected by any of the blind detection techniques, the UE can utilize more downlink RSs for estimating the cell signal power (e.g., the RSRP).

In other alternatives, blind detection techniques can also determine whether DL subframes or MBSFN subframes have been detected.

These and other aspects are described in detail in the following.

Figure 7A:
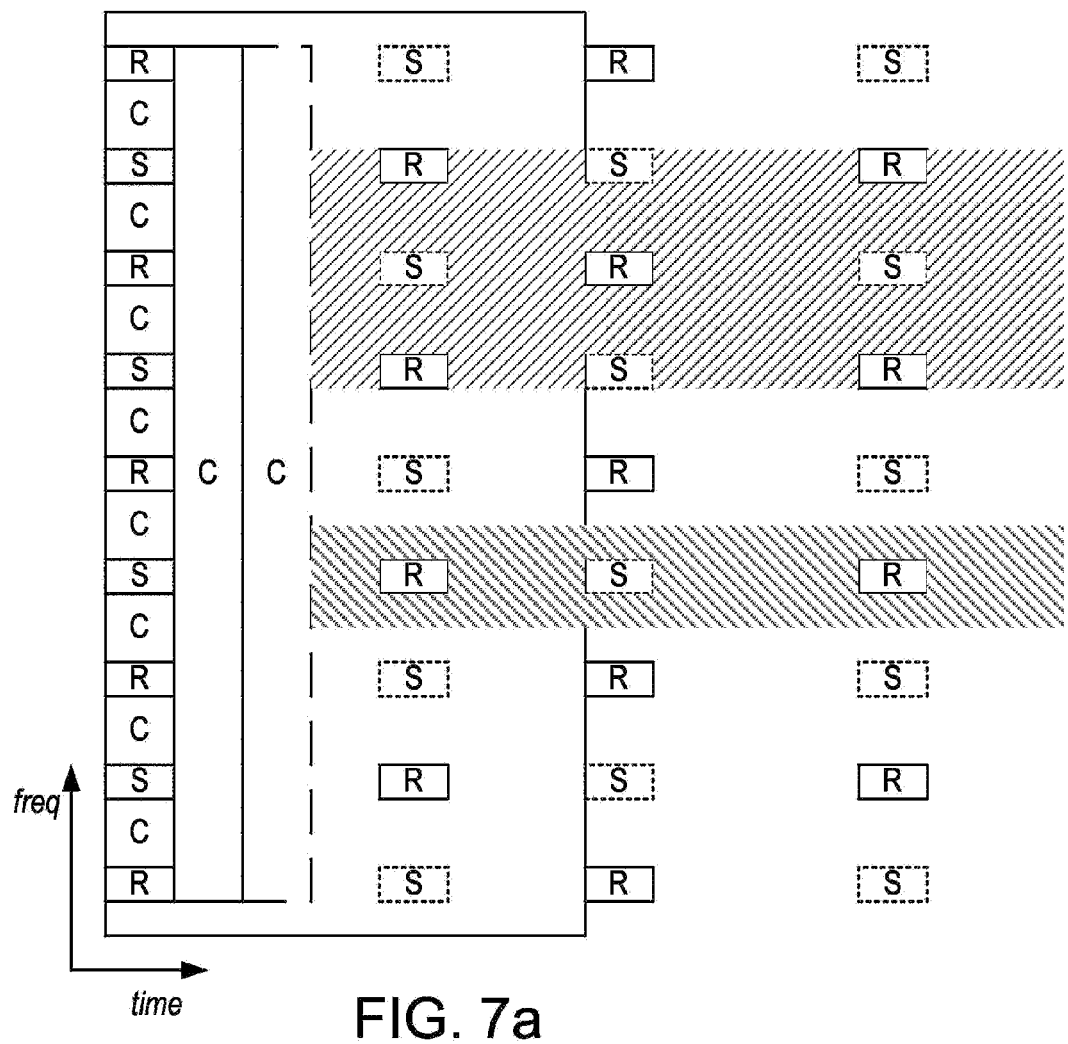
FIG. 7a is a signal timing diagram of an exemplary downlink subframe in an LTE mobile communication system.

FIG. 7a is a signal timing diagram of an exemplary downlink subframe (1 ms, divided into two downlink slots) in an LTE mobile communication system. Included within this subframe are REs that are used for conveying RS for transmit antenna 1 (denoted "R" in the figure) and also REs that are used for conveying RSs associated with a potential transmit antenna 2 (denoted "S" in the figure). Also shown in the FIG. 7a are the positions in which control information (denoted "C" in the figure) is sent. It will be observed that the control information is communicated in only the first 1, 2, or 3 OFDM symbols of each subframe, whereas the RSs are present in both slots. The rest of the REs are, for the most part, allocated to data transmission.

Typically a cell is not fully loaded. Therefore, only a fraction of the data REs are non-empty. To illustrate this point, a first shaded group of REs 701 in FIG. 7a represents a first data transmission, and a second shaded group of REs 703 represents a second data transmission. Remaining data REs are unused in this example.

Figure 7B:
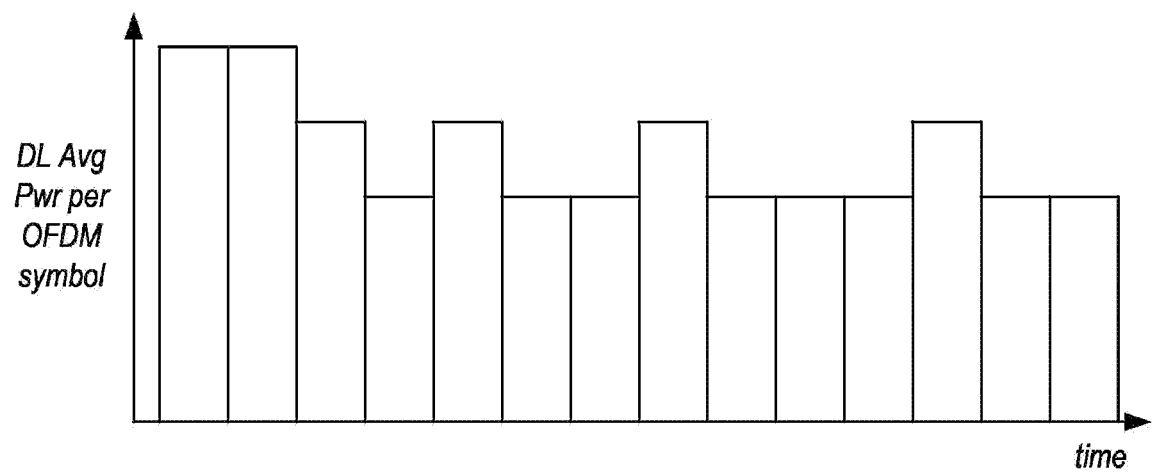
FIG. 7b is a graph of downlink average power for the two slots of FIG. 7a plotted as a function of time.

FIG. 7b is a graph of downlink average power for the two slots of FIG. 7a plotted as a function of time. Since the RSs as well as parts of the control signaling are always transmitted, the Received Signal Power Indicator (RSSI) is different for different OFDM symbols. Typically, the OFDM symbols 0 and 1 (which contain control information as well as RSs) have the largest power, the OFDM symbols containing RSs but not control information have slightly lower average power, and the OFDM symbols having only data information on average have the lowest power.

Figure 7C:
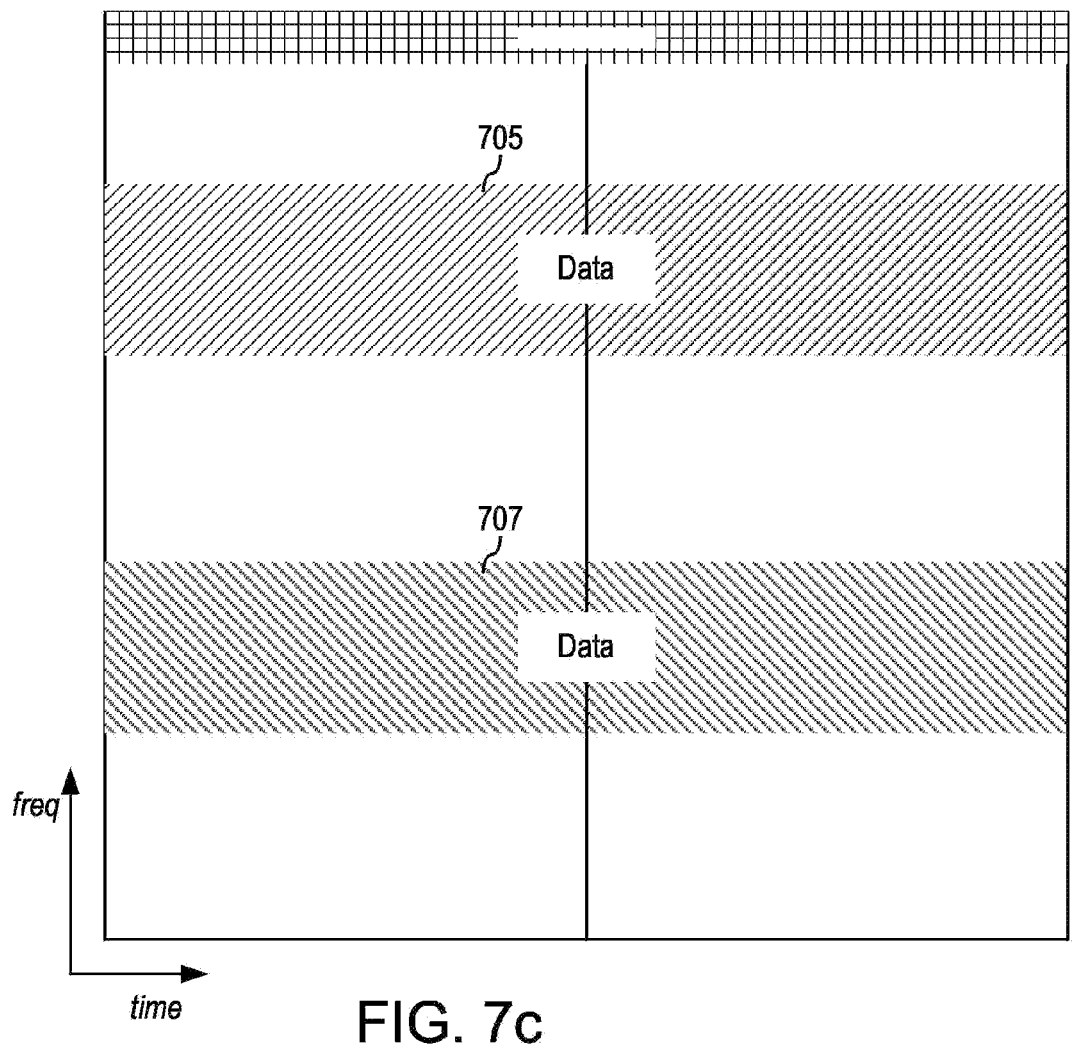
FIG. 7c depicts two uplink data transmissions of an exemplary LTE system uplink subframe.

The situation is different in the uplink direction when different modulation technology is used. For example, in an LTE system, SC-FDMA is used for uplink transmissions. The data and control, which are sent on a physical uplink shared channel (PUSCH) and a physical uplink control channel (PUCCH) respectively, are sent on separate resource blocks. Consequently, a UE transmitting data utilizes allocated frequencies continuously for at least an amount of time corresponding to one subframe (i.e., 2 slots). FIG. 7c depicts two data transmissions 705 and 707 to illustrate this point. UEs transmitting only control information (e.g., ACK/NACK of downlink blocks) have a consecutive time-frequency block at the end of the system BW. FIG. 7c depicts two control signaling transmissions 709 and 711 to illustrate this point.

Figure 7D:
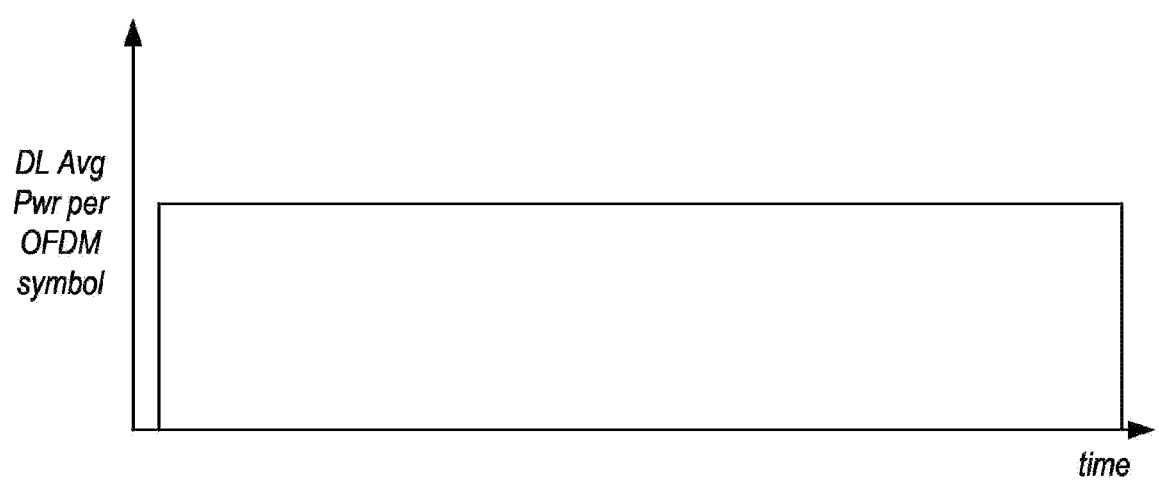
FIG. 7d is a graph of average power for the time period depicted in FIG. 7c plotted as a function of time.

FIG. 7d is a graph of average power for the time period depicted in FIG. 7c plotted as a function of time. Because of the continuous nature of the transmissions, the frequency domain power profile is more evenly spread over the subframe. In an aspect of some embodiments consistent with the invention, this property is used to enable a UE detect whether the received signal of a detected cell corresponds to a downlink or an uplink subframe.

Figure 8:
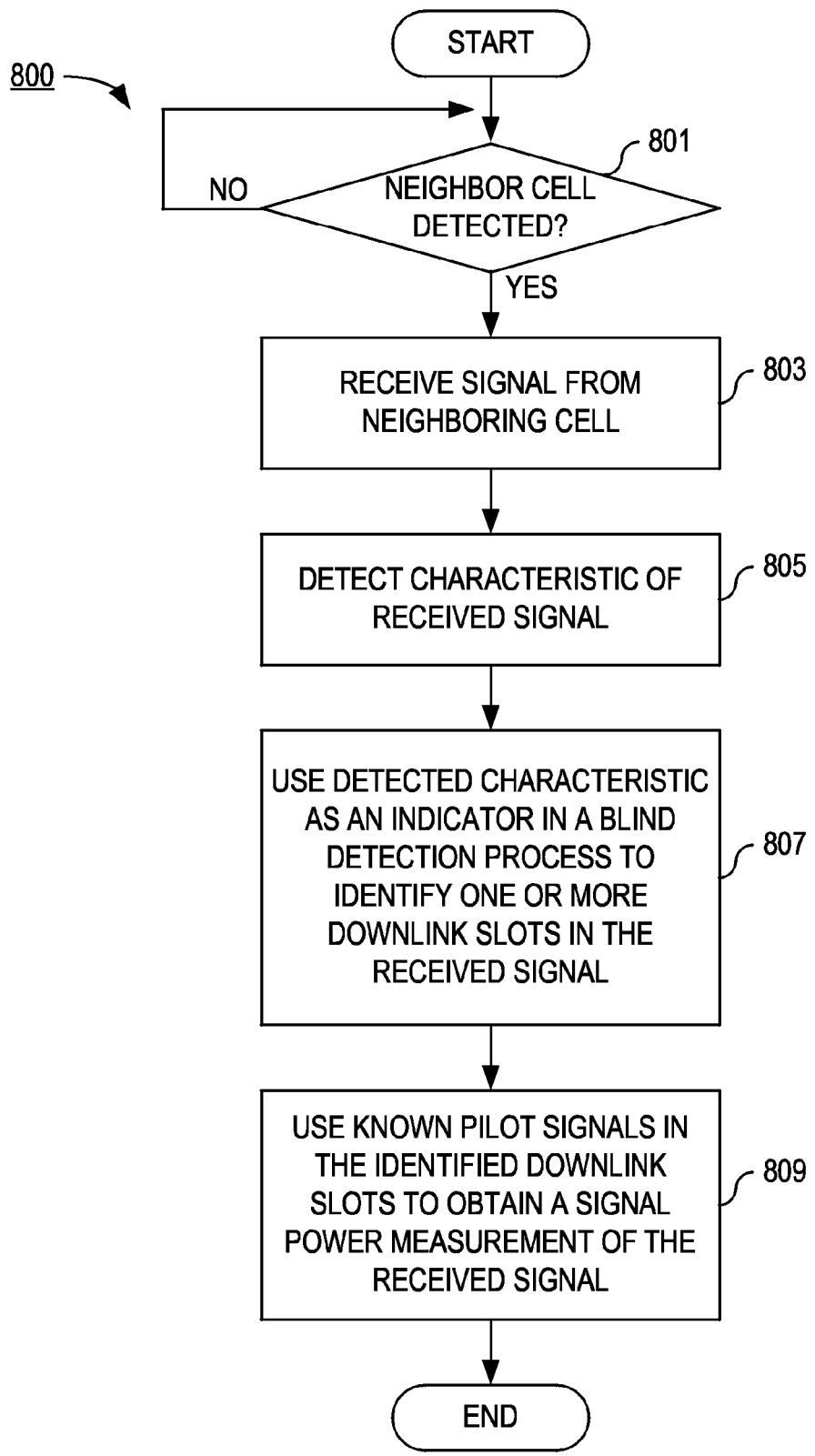
FIG. 8 is, in one respect, a flowchart of exemplary steps/processes performed in a UE in accordance with embodiments consistent with the invention.

FIG. 8 is, in one respect, a flowchart of exemplary steps/processes performed in a UE in accordance with embodiments consistent with the invention. In another respect, FIG. 8 can be considered to be a block diagram of a UE 800 comprising logic configured to perform the variously described functions. It is assumed at the start that the UE is connected to a serving cell and is searching for TDD neighboring cells. The neighboring cell could be operating on either an intra-frequency (i.e., the same carrier frequency as the serving cell) or an inter-frequency, (i.e., a different carrier frequency than is used by the serving cell). In the case of inter-frequency operation, the UE typically makes its measurements during time instances in which the serving cell's data reception has been interrupted.

The UE uses any of a number of known search algorithms to discover a neighboring cell ("YES" path out of decision block 801). The particular search algorithm employed for this purpose is outside the scope of the invention.

Once a neighbor cell has been detected, a signal from that neighbor cell is received (step 803). A characteristic of the received signal is detected (step 805) and then used as an indicator in a blind detection process to identify one or more downlink slots in the received signal (step 807). The particular characteristic detected will depend on the type of blind detection process employed. These aspects are described in greater detail below.

Having identified one or more downlink slots, known pilot signal in these downlink slots are used to obtain a signal power (or similar) measurement of the received signal (step 809).

Figure 9:
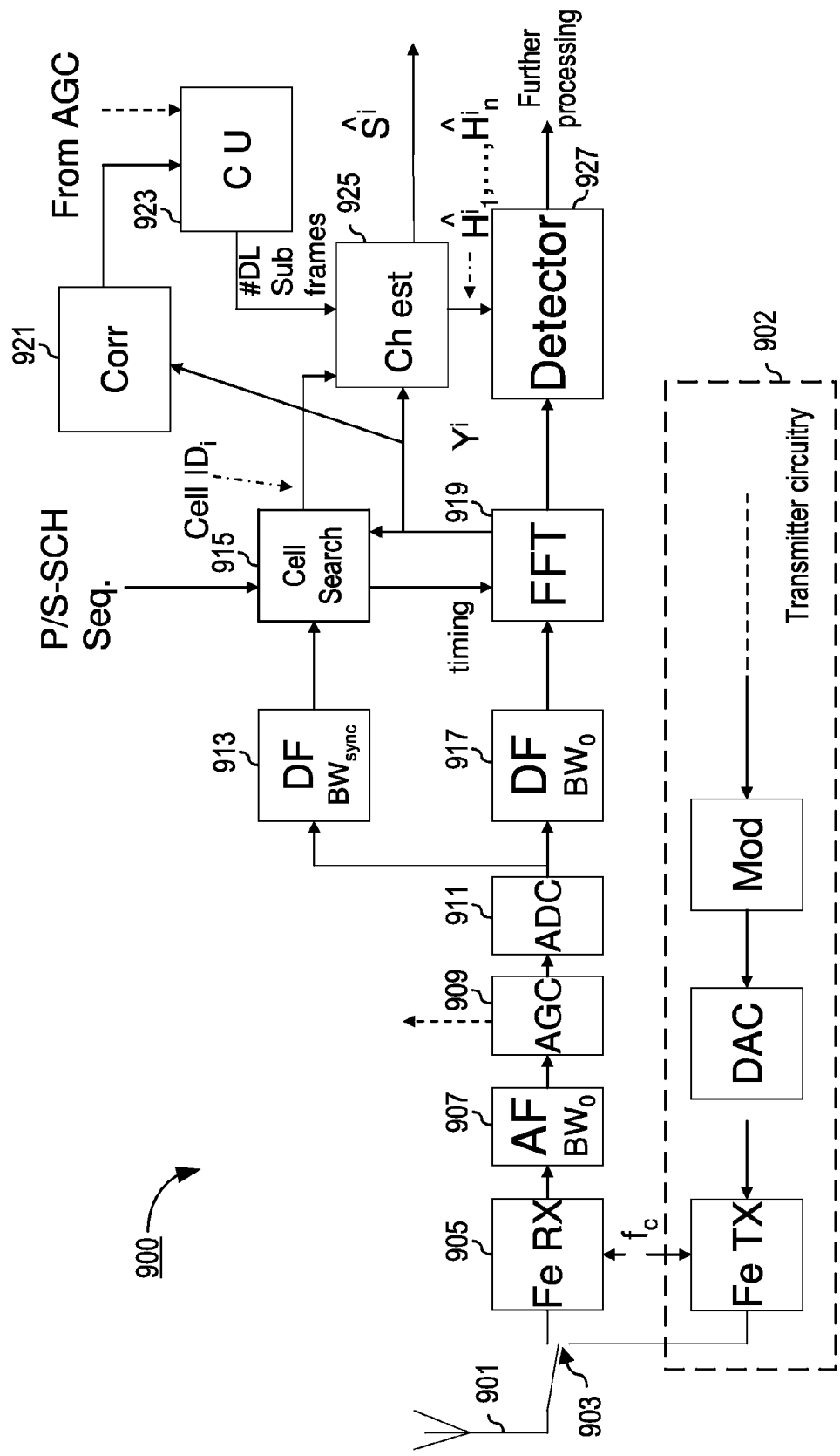
FIG. 9 is a block diagram of an exemplary UE adapted to carry out various aspects of the invention.

A block diagram of a UE 900 adapted to carry out various aspects of the invention is shown in FIG. 9. It will be appreciated that the functional blocks depicted in FIG. 9 can be combined and re-arranged in a variety of equivalent ways, and that the many of the functions can be performed by one or more suitably programmed digital signal processors.

As depicted in FIG. 9, a UE 900 has an antenna 901 that is shared by receiver circuitry as well as by transmitter circuitry 902. As the various aspects of the invention are primarily concerned with receiver operation, the transmitter circuitry 902 is not described here in detail.

When a switch 903 is in a receive position, the UE 900 receives a downlink radio signal through the antenna 901 and typically down-converts the received radio signal to an analog baseband signal in a front end receiver (Fe RX) 905. For this purpose, the front end receiver 905 is supplied with a locally-generated carrier frequency, $f_c$. The baseband signal is spectrally shaped by an analog filter 907 that has a bandwidth $BW_0$, and the shaped baseband signal generated by the filter 907 is gain corrected by automatic gain control (AGC) circuitry 909. The gain corrected signal is then converted from analog to digital form by an analog-to-digital converter (ADC) 911.

The digitized baseband signal is further spectrally shaped by a digital filter 913 that has a bandwidth $BW_{sync}$, which corresponds to bandwidth of the synchronization signals or symbols included in the downlink signal. The shaped signal generated by the filter 913 is provided to a cell search unit 915 that carries out one or more methods of searching for cells as specified for the particular communication system (e.g., 3G LTE). Typically, such methods involve detecting predetermined primary and/or secondary synchronization channel (P/S-SCH) signals in the received signal as described earlier.

The digitized baseband signal is also provided by the ADC 911 to a digital filter 917 that has the bandwidth $BW_0$, and the filtered digital baseband signal is provided to a processor 919 that implements a Fast Fourier Transform (FFT) or other suitable algorithm that generates a frequency-domain (spectral) representation of the baseband signal. The cell search unit 915 exchanges suitable timing signals with the processor 919 for each candidate cell; that is, for each cell whose signal power (e.g., RSRP) will be measured.

The frequency-domain samples are also fed to a correlation unit 923 that correlates the samples to either (a) the known downlink RS positions or (b) a typical downlink (sub-carrier) power profile or RSSI pattern as described in greater detail below. The output from the correlation unit 921 is then fed to a control unit (CU) 923 that, based on the correlation result, detects which subframes are downlink and which ones are uplink. That information (i.e., the number and position of downlink subframes) is then fed to a channel estimation unit 925 (and FFT 919).

The cell search unit 915 also provides cell identifications and REs corresponding to RSs for each candidate cell i to the channel estimation unit 925, which also receives timing signals from the processor 919 and, using the knowledge of which subframes are downlink subframes, generates a channel estimate $H_j^i$ for each of several subcarriers j and an estimate of the signal power (e.g., RSRP, $S^i$) for the candidate cell i.

The channel estimation unit 925 provides the channel estimates $H_j^i$ to a symbol detector 927. The detected symbols are then made available for further processing in the UE (not shown). The power estimates generated by the channel estimation unit 925 are typically also used in further signal processing in the UE.

The blind uplink/downlink detection can take any of a number of embodiments. These are described in the following text.

Figure 10:
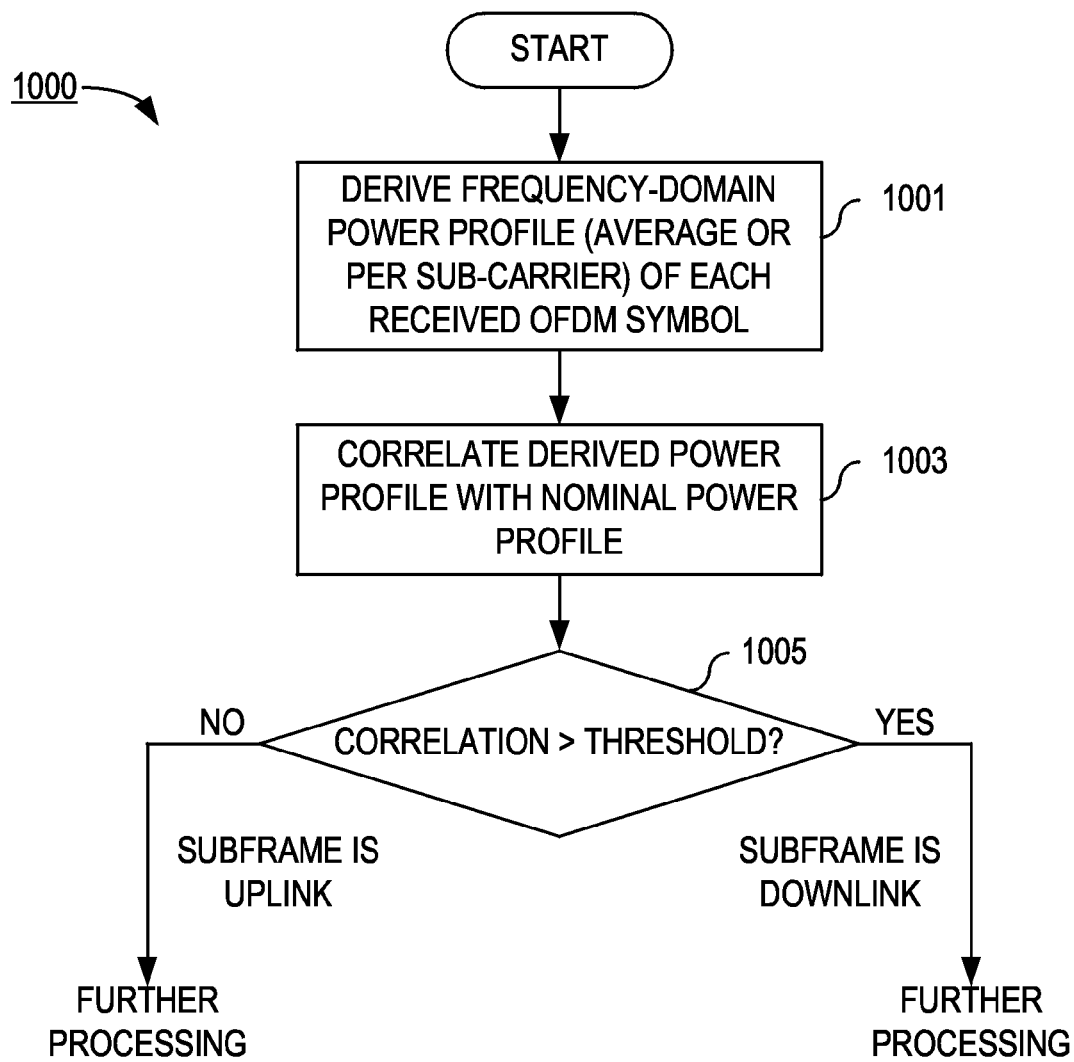
FIG. 10 is, in one respect, a flowchart of steps/processes carried out in a UE in accordance with embodiments in which a blind detection process relies on a frequency-domain power profile of a received signal.

In an aspect of some embodiments, a frequency domain power profile is the characteristic upon which blind detection is made. FIG. 10 is, in one respect, a flowchart of steps/processes carried out in a UE in accordance with these embodiments. In another respect, FIG. 10 can also be considered to be a block diagram of a UE 1000 having logic configured to perform the various described processes/steps. Two different approaches can be used in these embodiments. The first—and less complex one—is to correlate a received subframe with the average power (total RSSI) per OFDM symbol. That is, a power profile of each OFDM symbol is measured (step 1001) and correlated with a nominal (e.g., typical) downlink power profile (step 1003), as illustrated in FIG. 7b. The correlation can be made over one subframe. To improve performance, the profile can (but doesn't have to be) averaged over a number of subframes. The resulting correlation value is compared to a threshold (decision block 1005). If the correlation value is above the threshold (YES path out of decision block 1005), then a downlink subframe has been detected, otherwise (NO path out of decision block 1005) an uplink subframe has been detected. The threshold could, for example, be derived from the power profile for the synchronization subframe (i.e., a subframe known to be a downlink subframe for the UE). Further processing (not shown) proceeds according to whether an uplink or downlink subframe was detected.

Equivalently, instead of correlating the OFDM symbol with a nominal downlink power profile, it is instead correlated with a nominal (e.g., typical) uplink power profile, as illustrated in FIG. 7d. The correlation value exceeding the threshold value in this case indicates that an uplink subframe has been detected. Otherwise, the subframe is a downlink subframe.

An alternative embodiment involves a more complicated variant, in which the correlation is made over each sub-carrier. Hence, for each OFDM symbol the power per sub-carrier is estimated and correlated to a typical power profile, which now has two dimensions, namely time and frequency. Again the correlation is compared to a threshold, as described above, in order to determine whether the analyzed signal is associated with an uplink or a downlink subframe.

Figure 11:
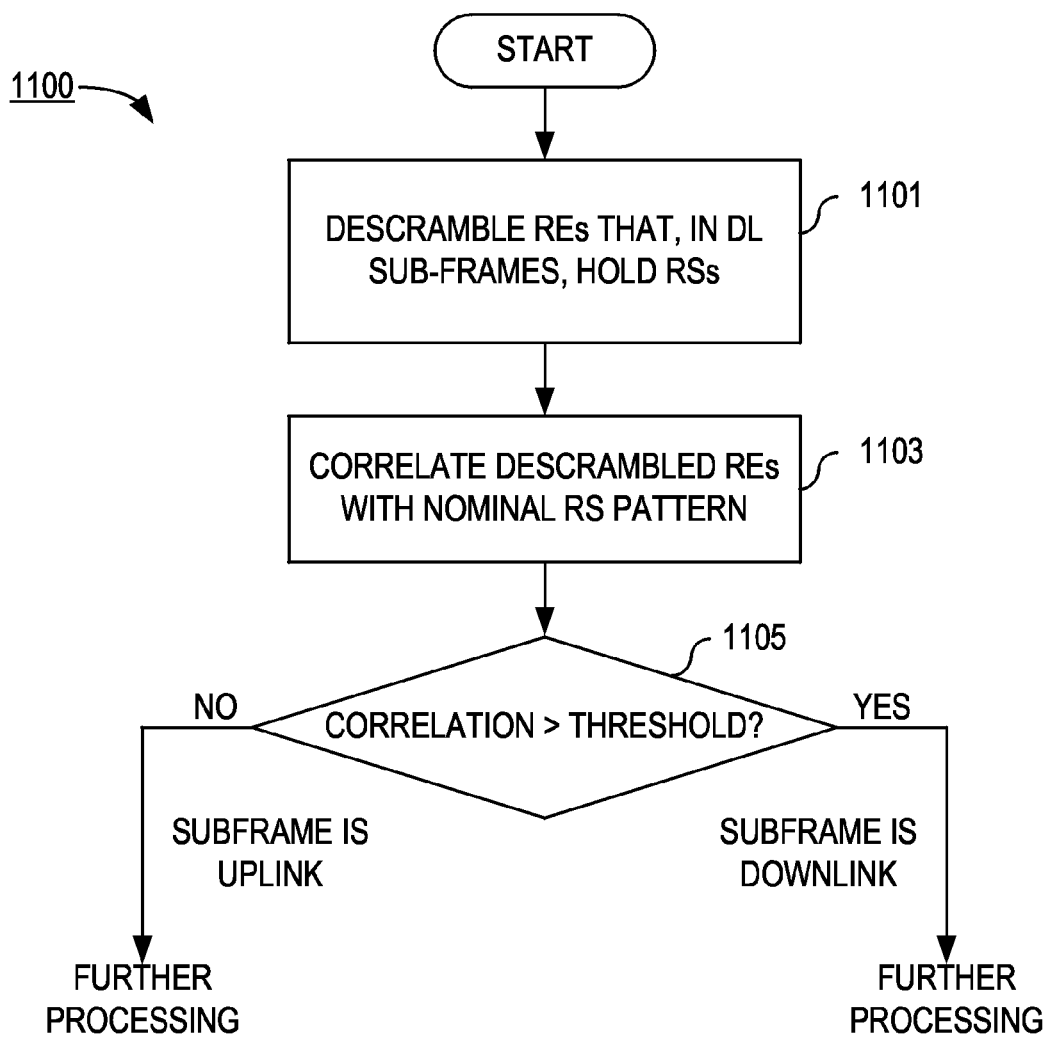
FIG. 11 is, in one respect, a flowchart of steps/processes carried out in a UE in accordance with embodiments in which a blind detection process relies on the contents of resource elements that could be conveying reference symbols.

In an aspect of some alternative embodiments, the REs that could be conveying RSs serve as the characteristic upon which blind detection is made. FIG. 11 is, in one respect, a flowchart of steps/processes carried out in a UE in accordance with these embodiments. In another respect, FIG. 11 can also be considered to be a block diagram of a UE 1100 having logic configured to perform the various described processes/steps. Using this detection approach, the UE 1100 descrambles the REs (with scrambling code corresponding to the cell ID for the neighboring cell) that—in the case of a downlink subframe—are RSs (step 1101). The descrambled REs are then correlated with the nominal RS pattern (step 1103). The correlation value is then compared with a threshold (decision block 1105). If the correlation value exceeds the threshold value (YES path out of decision block 1105), the subframe is considered to be a downlink subframe. Otherwise (NO path out of decision block 1105), the subframe is considered to be an uplink subframe. Further processing (not shown) proceeds according to whether an uplink or downlink subframe was detected.

Figure 12:
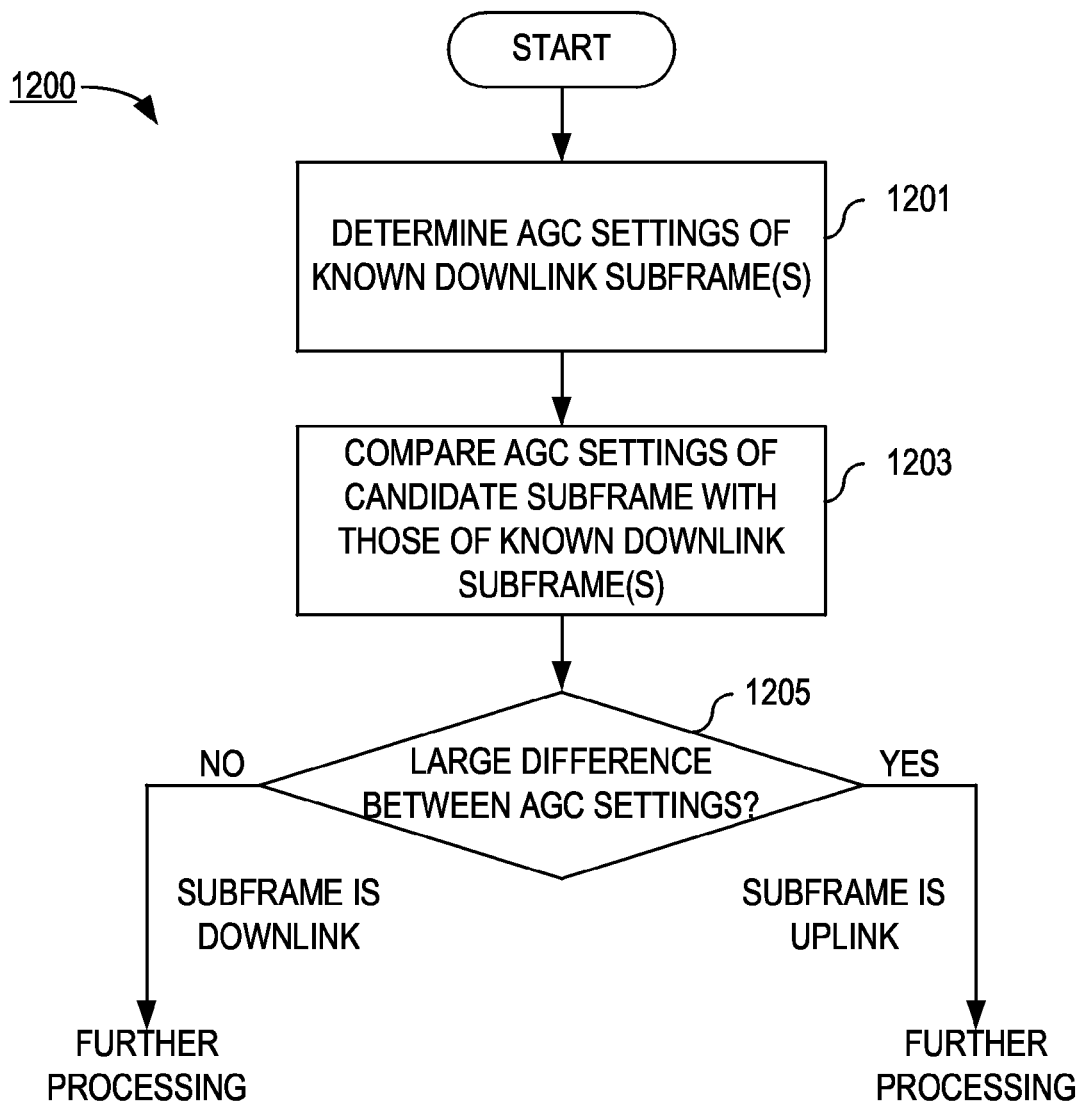
FIG. 12 is, in one respect, a flowchart of steps/processes carried out in a UE in accordance with embodiments in which a blind detection process relies on AGC settings in the receiver.

In an aspect of some other alternative embodiments, the AGC settings in the receiver serve as the characteristic upon which blind detection is made. FIG. 12 is, in one respect, a flowchart of steps/processes carried out in a UE in accordance with these embodiments. In another respect, FIG. 12 can also be considered to be a block diagram of a UE 1200 having logic configured to perform the various described processes/steps.

A principle upon which these embodiments operate is that uplink subframes can consist of a signal with low signal power, for example as a result of no uplink transmission taking place at all or due to a transmitting UE being far away from the UE 1200 trying to receive the signal (and measure the signal power). In both of these cases, the received signal power in such a subframe is small compared to that of a downlink subframe. In case the transmitting UE is close to the UE 1200 trying to receive the signal, the input signal will be very strong relative the strength of a signal associated with a downlink subframe. Since the UE 1200, once it has detected the neighboring cell, always knows at least some of the downlink subframes (i.e., those subframes that are used for downlink transmissions regardless of UL/DL configuration), the UE 1200 can compare the AGC settings of an unknown subframe with those associated with a known downlink subframe. If the comparison reveals a large enough difference, this can be taken as an indicator of an uplink subframe; otherwise, the unknown subframe can be considered a downlink subframe. Such information could also, in some embodiments be used for determining the UL/DL subframe configuration.

Thus, in accordance with these embodiments the UE 1200 determines the AGC settings of one or more known downlink subframes (step 1201). Next, the AGC settings of a candidate "unknown" subframe are compared with those of the known down subframe(s) (step 1203). If the comparison shows large differences (YES path out of decision block 1205), then the candidate subframe is considered to be an uplink subframe. Otherwise (NO path out of decision block 1205), the candidate subframe is considered to be a downlink subframe. For example, if the AGC settings differ by more than a factor of 5 (7 dB) or so, then it is reasonable to assume the presence of an uplink rather than a downlink subframe. Hence, if an AGC setting is x for a known downlink subframe, an uplink subframe can be considered to be detected if the AGC setting is below 0.2x or above 5x.

Further processing (not shown) proceeds according to whether an uplink or downlink subframe was detected.

Figure 13:
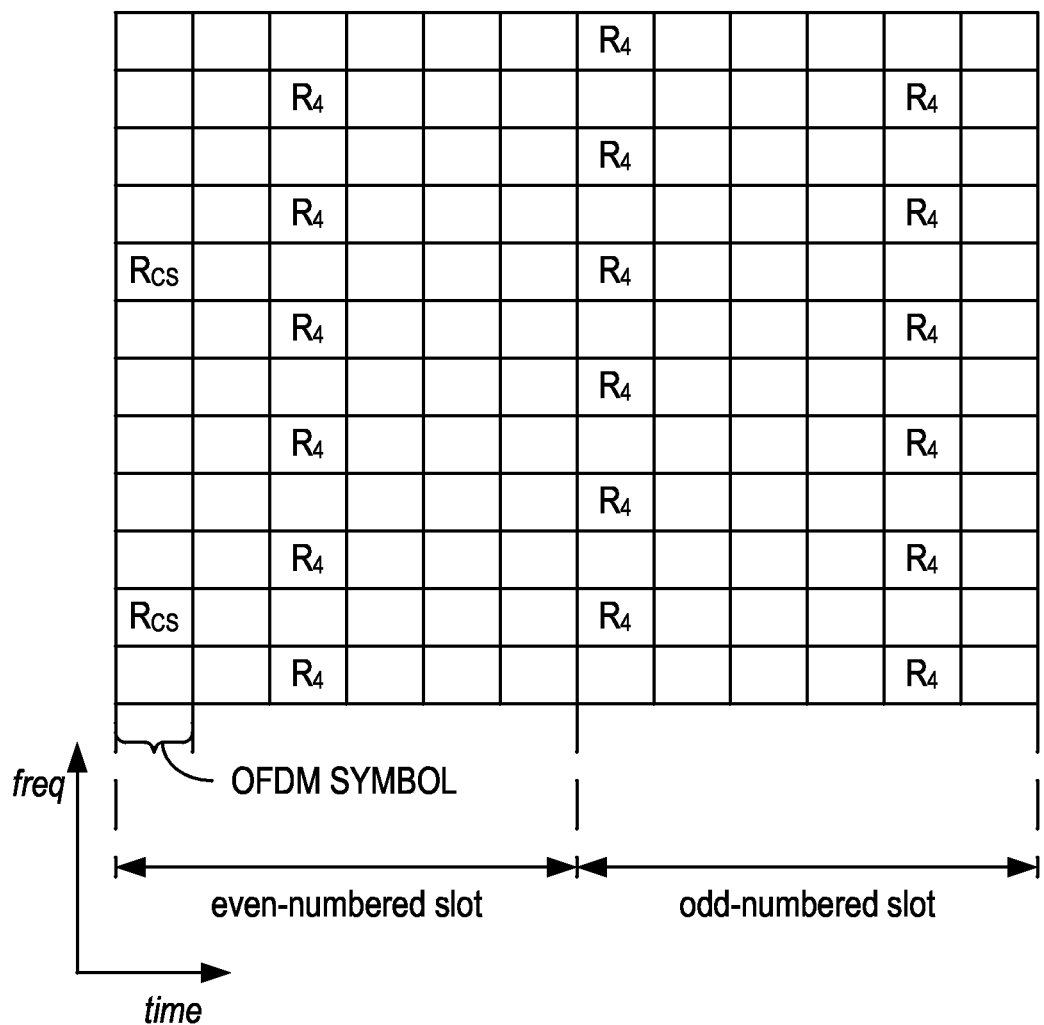
FIG. 13 depicts an exemplary MBSFN resource element transmitted on an antenna port over the course of two sequential slots.

Various aspects of embodiments consistent with the invention have been described in terms of detection of downlink subframes on a TDD neighboring cell. However, the blind detection techniques can also be applied to other scenarios. One such scenario is MBSFN operation, in which some of the downlink subframes are allocated to broadcast use. These downlink subframes have a slightly different structure relative to ordinary unicast subframes. This difference is illustrated in FIG. 13, which depicts an exemplary MBSFN resource element transmitted on antenna port 4 over the course of two sequential slots. It will be recalled that in MBSFN operation, synchronous multi-cell multicast/broadcast transmission is made to appear as a single transmission over a multi-path channel. To accommodate the larger propagation delays (i.e., a UE receives transmissions not only from a nearest NodeB, but also from neighboring NodeBs), an extended CP is used. Hence, each slot has only six OFDM symbols instead of the seven normally present in unicast operation.

Channel estimation for coherent demodulation of an MBSFN transmission cannot directly rely on the "normal" cell-specific reference signals ($R_{CS}$) described earlier, since these reference signals are not transmitted by means of MBSFN and thus do not reflect the aggregated MBSFN channel. Instead, additional reference symbols ($R_4$) are inserted within MBSFN subframes, as illustrated in FIG. 13. These reference symbols are transmitted by means of MBSFN; that is, identical reference symbols (the same complex value within the same resource element) are transmitted by all cells involved in the MBSFN transmission. The corresponding received reference signal can thus directly be used for estimation of the aggregated MBSFN channel, enabling coherent demodulation of the MBSFN transmission.

Although there is no need to transmit downlink L1/L2 control signaling related to Downlink Shared Channel (DL-SCH) transmission in MBSFN subframes, there may nonetheless be other downlink L1/L2 control signaling to be transmitted in MBSFN subframes (e.g., scheduling grants for UL-SCH transmission). Consequently, normal cell-specific reference signals ($R_{CS}$) also need to be transmitted within the MBSFN subframes, in parallel with the MBSFN-based reference signal. However, since the L1/L2 control signaling is confined to the first part of the subframe, only the cell-specific reference symbols within the first OFDM symbol of the subframe (as well as the second OFDM symbol of the subframe in case of four transmit antennas) are transmitted within MBSFN subframes, as shown in FIG. 13.

As a result of this arrangement, MBSFN subframes have fewer RSs that can be used for RSRP measurements (i.e., only those found in the first OFDM symbol per subframe). Aside from knowing that in MBSFN there are always two synchronization subframes having cell-specific reference symbols, a UE doesn't know the exact number and position of ordinary and MBSFN subframes in a neighboring cell. This uncertainty causes a problem for a UE that wants to make power measurements of cell-specific reference signals of a neighboring cell.

Aspects of the invention address this problem in that similar approaches as those described above (e.g., correlation to the RS positions for an ordinary DL subframe) can be used to detect which subframes are MBSFN subframes and which are not. The RSRP measurement can consequently be adapted to the detected number of ordinary subframes. Also note that, with respect to MBSFN operation, the various aspects of the invention are applicable to both LTE FDD and TDD mode.

Figure 14:
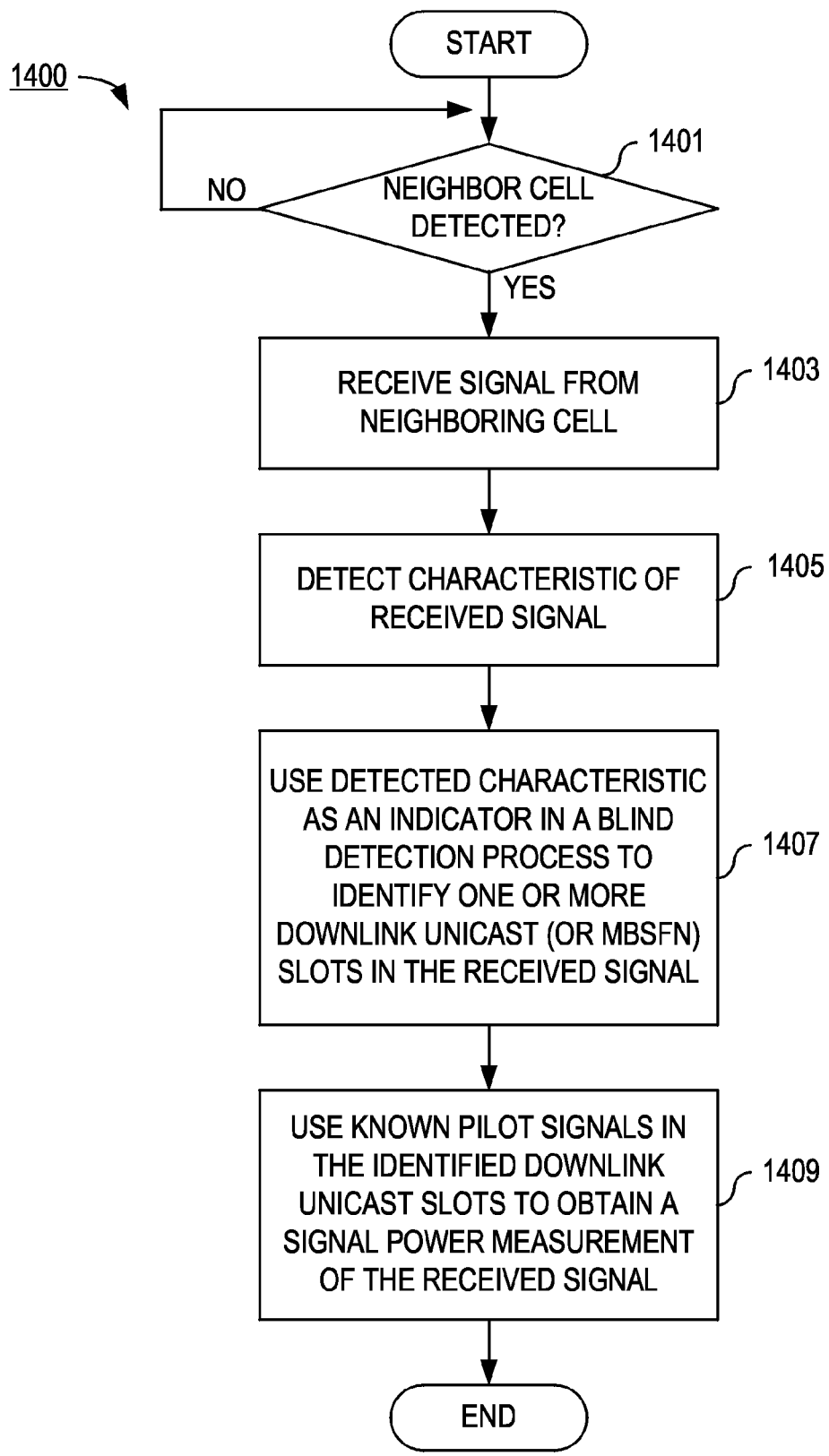
FIG. 14 is, in one respect, a flowchart of exemplary steps/processes performed in a UE in accordance with embodiments that enable the UE to detect whether slots of a neighboring cell's signal are downlink unicast slots or MBSFN slots.

FIG. 14 is, in one respect, a flowchart of exemplary steps/processes performed in a UE in accordance with embodiments consistent with the invention. In another respect, FIG. 14 can be considered to be a block diagram of a UE 1400 comprising logic configured to perform the variously described functions. It is assumed at the start that the UE is connected to a serving cell and is searching for TDD or FDD neighboring cells. The neighboring cell could be operating on either an intra-frequency (i.e., the same carrier frequency as the serving cell) or an inter-frequency, (i.e., a different carrier frequency than is used by the serving cell). In the case of inter-frequency operation, the UE typically makes its measurements during time instances in which the serving cell's data reception has been interrupted.

The UE uses any of a number of known search algorithms to discover a neighboring cell ("YES" path out of decision block 1401). The particular search algorithm employed for this purpose is outside the scope of the invention.

Once a neighbor cell has been detected, a signal from that neighbor cell is received (step 1403). A characteristic of the received signal is detected (step 1405) and then used as an indicator in a blind detection process to identify one or more downlink unicast slots (or alternatively, MBSFN slots) in the received signal (step 1407). The particular characteristic detected will depend on the type of blind detection process employed. These aspects are described in detail above.

Having identified one or more downlink unicast slots, known pilot signal in these downlink slots are used to obtain a signal power (or similar) measurement of the received signal (step 1409). In some, but not necessarily all embodiments, cell-specific RSs from the MBSFN subframes are also used in the RSRP estimation.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment (UE) in a cellular telecommunications system, the method comprising:
   receiving a signal from a neighboring cell, wherein the signal comprises a plurality of slots of which some of the plurality of slots are downlink slots and some of the plurality of slots are uplink slots, and wherein a configuration of the downlink and uplink slots is unknown;
   detecting a characteristic of the received signal;
   using the detected characteristic as an indicator in a blind detection process that relies on characteristic differences between uplink and downlink slots to identify the configuration of the downlink and uplink slots in the received signal; and
   using the identified configuration of the downlink and uplink slots to obtain known pilot signals from one or more downlink slots of the received signal and using the known pilot signals to obtain a signal power measurement of the received signal,
   wherein:
   the detected characteristic is a detected information content of resource elements of the received signal known to be reference symbol resource elements in a downlink subframe, wherein each resource element is defined by subcarrier frequency and time of occurrence; and
   the blind detection process comprises correlating the detected information content with information content of one or more known reference symbols.

2. A method of operating a user equipment (UE) in a cellular telecommunications system, the method comprising:
   receiving a signal from a neighboring cell, wherein the signal comprises a plurality of slots of which some of the plurality of slots are downlink slots and some of the plurality of slots are uplink slots, and wherein a configuration of the downlink and uplink slots is unknown;
   detecting a characteristic of the received signal;
   using the detected characteristic as an indicator in a blind detection process that relies on characteristic differences between uplink and downlink slots to identify the configuration of the downlink and uplink slots in the received signal; and
   using the identified configuration of the downlink and uplink slots to obtain known pilot signals from one or more downlink slots of the received signal and using the known pilot signals to obtain a signal power measurement of the received signal,
   wherein:
   the detected characteristic is a detected automatic gain control setting used to receive the received signal; and
   the blind detection process comprises comparing the detected automatic gain control setting with an automatic gain control setting of a known downlink slot.

3. A method of operating a user equipment (UE) in a cellular telecommunications system having a radio interface that comprises a plurality of downlink slots of which some of the plurality of downlink slots are downlink unicast slots and some of the plurality of downlink slots are Multicast-Broadcast Single Frequency Network slots, the method comprising:
   receiving a signal from a neighboring cell during one or more of the plurality of downlink slots;
   detecting a characteristic of the received signal;
   using the detected characteristic as an indicator in a blind detection process that relies on characteristic differences between the downlink unicast slots and the Multicast-Broadcast Single Frequency Network slots to identify one or more of the downlink unicast slots that may be present in the one or more of the downlink slots; and in response to the one or more identified downlink unicast slots being identified in the one or more of the plurality of downlink slots, using known pilot signals in the one or more identified downlink unicast slots to obtain a signal power measurement of the received signal, wherein:

the detected characteristic is a detected information content of resource elements of the received signal known to be reference symbol resource elements in a downlink subframe, wherein each resource element is defined by subcarrier frequency and time of occurrence; and the blind detection process comprises correlating the detected information content with information content of one or more known reference symbols.

4. A method of operating a user equipment (UE) in a cellular telecommunications system having a radio interface that comprises a plurality of downlink slots of which some of the plurality of downlink slots are downlink unicast slots and some of the plurality of downlink slots are Multicast-Broadcast Single Frequency Network slots, the method comprising:

receiving a signal from a neighboring cell during one or more of the plurality of downlink slots;

detecting a characteristic of the received signal;

using the detected characteristic as an indicator in a blind detection process that relies on characteristic differences between the downlink unicast slots and the Multicast-Broadcast Single Frequency Network slots to identify one or more of the downlink unicast slots that may be present in the one or more of the downlink slots; and in response to the one or more identified downlink unicast slots being identified in the one or more of the plurality of downlink slots, using known pilot signals in the one or more identified downlink unicast slots to obtain a signal power measurement of the received signal, wherein:

the detected characteristic is a detected automatic gain control setting used to receive the received signal; and the blind detection process comprises comparing the detected automatic gain control setting with an automatic gain control setting of a known downlink slot.

5. A user equipment (UE) in a cellular telecommunications system, the user equipment comprising:

logic circuitry configured to receive a signal from a neighboring cell, wherein the signal comprises a plurality of slots of which some of the plurality of slots are downlink slots and some of the plurality of slots are uplink slots, and wherein a configuration of the downlink and uplink slots is unknown;

logic circuitry configured to detect a characteristic of the received signal;

logic circuitry configured to use the detected characteristic as an indicator in a blind detection process that relies on characteristic differences between uplink and downlink slots to identify the configuration of the downlink and uplink slots in the received signal; and logic circuitry configured to use the identified configuration of the downlink and uplink slots to obtain known pilot signals from one or more downlink slots of the received signal and using the known pilot signals to obtain a signal power measurement of the received signal, wherein:

the detected characteristic is a detected information content of resource elements of the received signal known to be reference symbol resource elements in a downlink subframe, wherein each resource element is defined by subcarrier frequency and time of occurrence; and the blind detection process comprises correlating the detected information content with information content of one or more known reference symbols.

6. A user equipment (UE) in a cellular telecommunications system, the user equipment comprising:

logic circuitry configured to receive a signal from a neighboring cell, wherein the signal comprises a plurality of slots of which some of the plurality of slots are downlink slots and some of the plurality of slots are uplink slots, and wherein a configuration of the downlink and uplink slots is unknown;

logic circuitry configured to detect a characteristic of the received signal;

logic circuitry configured to use the detected characteristic as an indicator in a blind detection process that relies on characteristic differences between uplink and downlink slots to identify the configuration of the downlink and uplink slots in the received signal; and logic circuitry configured to use the identified configuration of the downlink and uplink slots to obtain known pilot signals from one or more downlink slots of the received signal and using the known pilot signals to obtain a signal power measurement of the received signal, wherein:

the detected characteristic is a detected automatic gain control setting used to receive the received signal; and the blind detection process comprises comparing the detected automatic gain control setting with an automatic gain control setting of a known downlink slot.

7. A user equipment (UE) in a cellular telecommunications system having a radio interface that comprises a plurality of downlink slots of which some of the plurality of downlink slots are downlink unicast slots and some of the plurality of downlink slots are Multicast-Broadcast Single Frequency Network slots, the user equipment comprising:

logic circuitry configured to receive a signal from a neighboring cell during one or more of the plurality of downlink slots;

logic circuitry configured to detect a characteristic of the received signal;

logic circuitry configured to use the detected characteristic as an indicator in a blind detection process that relies on characteristic differences between the downlink unicast slots and the Multicast-Broadcast Single Frequency Network slots to identify one or more of the downlink unicast slots that may be present in the one or more of the plurality of downlink slots; and logic circuitry configured to use known pilot signals in the one or more identified downlink unicast slots to obtain a signal power measurement of the received signal in response to the one or more identified downlink unicast slots being identified in the one or more of the plurality of downlink slots, wherein:

the detected characteristic is a detected information content of resource elements of the received signal known to be reference symbol resource elements in a downlink subframe, wherein each resource element is defined by subcarrier frequency and time of occurrence; and the blind detection process comprises correlating the detected information content with information content of one or more known reference symbols.

8. A user equipment (UE) in a cellular telecommunications system having a radio interface that comprises a plurality of downlink slots of which some of the plurality of downlink slots are downlink unicast slots and some of the plurality of downlink slots are Multicast-Broadcast Single Frequency Network slots, the user equipment comprising:

logic circuitry configured to receive a signal from a neighboring cell during one or more of the plurality of downlink slots;

logic circuitry configured to detect a characteristic of the received signal;

logic circuitry configured to use the detected characteristic as an indicator in a blind detection process that relies on characteristic differences between the downlink unicast slots and the Multicast-Broadcast Single Frequency Network slots to identify one or more of the downlink unicast slots that may be present in the one or more of the plurality of downlink slots; and logic circuitry configured to use known pilot signals in the one or more identified downlink unicast slots to obtain a signal power measurement of the received signal in response to the one or more identified downlink unicast slots being identified in the one or more of the plurality of downlink slots, wherein:

the detected characteristic is a detected automatic gain control setting used to receive the received signal; and the blind detection process comprises comparing the detected automatic gain control setting with an automatic gain control setting of a known downlink slot.

* * * * *

UNITED STATES PATENT AND TRADEMARK OFFICE
CERTIFICATE OF CORRECTION

| | |
|---|---|
| PATENT NO. | : 9,490,923 B2 |
| APPLICATION NO. | : 14/639050 |
| DATED | : November 8, 2016 |
| INVENTOR(S) | : Lindoff et al. |

It is certified that error appears in the above-identified patent and that said Letters Patent is hereby corrected as shown below:

On the Title Page

In item (72), under "Inventors", in Column 1, Line 1, delete "Bjarred (SE);" and insert -- Bjärred (SE); --, therefor.

In item (72), under "Inventors", in Column 1, Line 3, delete "Hollviken (SE);" and insert -- Höllviken (SE); --, therefor.

On Page 2, in item (56), under "OTHER PUBLICATIONS", in Column 1, Line 7, delete "(E-EUTRA);" and insert -- (E-UTRA); --, therefor.

In the Specification

In Column 1, Line 8, delete "2008," and insert -- 2008, now Patent No. 9,001,791 --, therefor.

Figure 3:
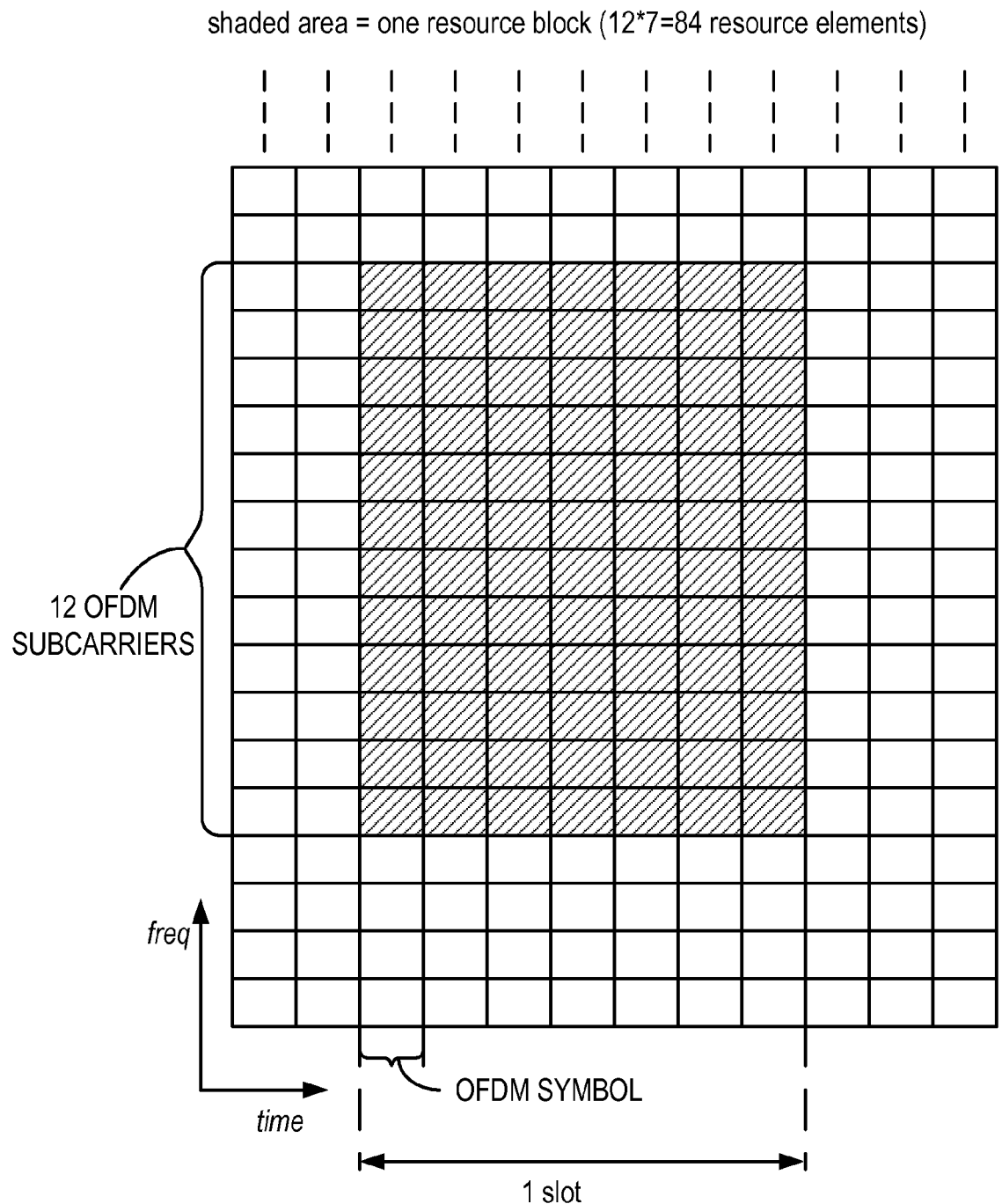
FIG. 3 is a time-frequency grid illustrating how downlink subcarriers in the frequency domain are grouped into resource blocks.
Figure 4A:
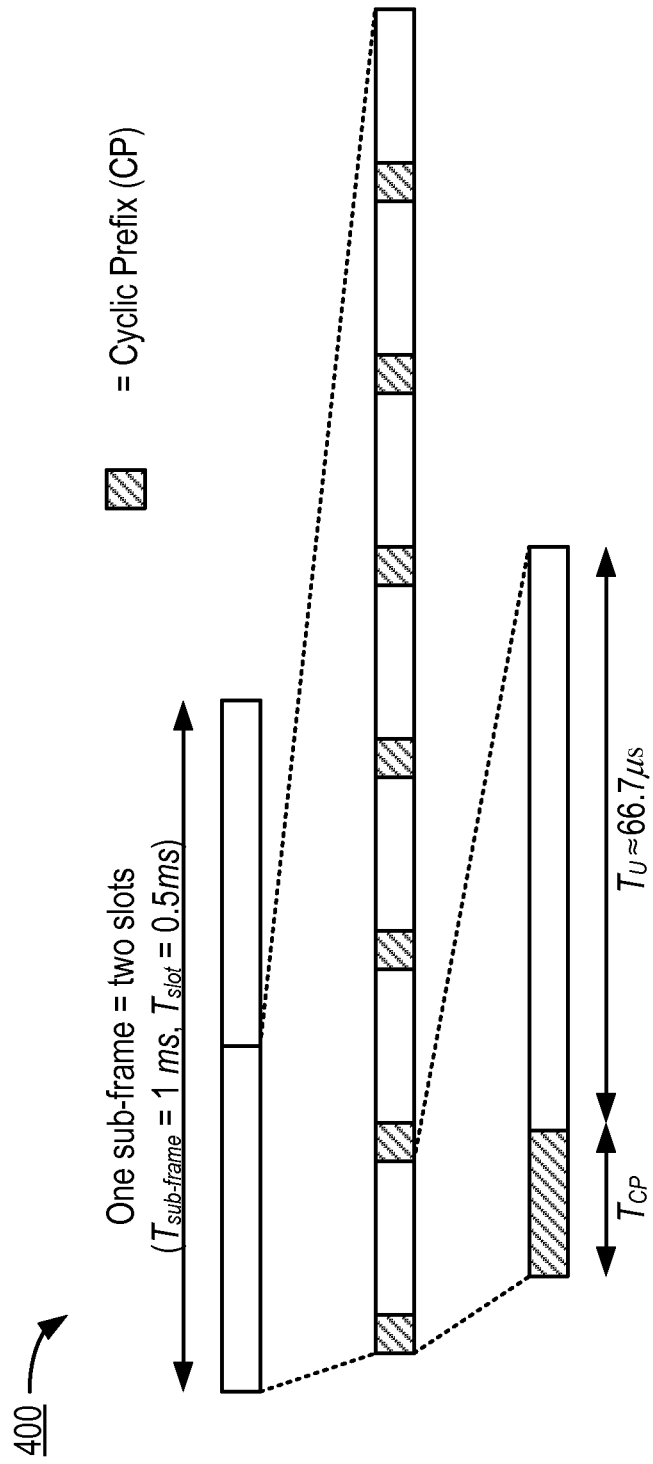
FIG. 4a illustrates a so-called "normal" cyclic prefix length, which allows seven OFDM symbols per slot to be communicated.
Figure 4B:
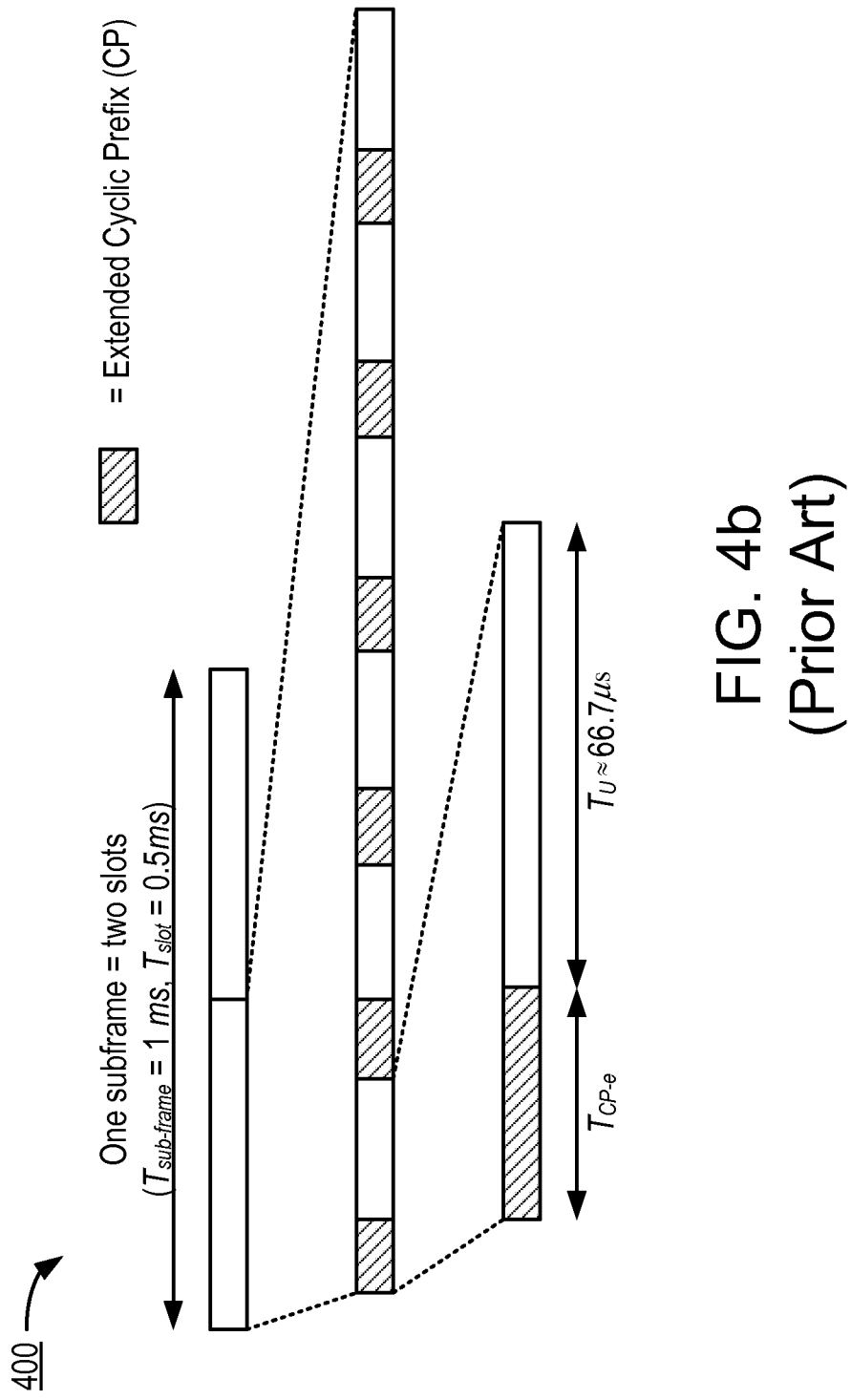
FIG. 4b illustrates an extended cyclic prefix, which because of its longer size, allows only six OFDM symbols per slot to be communicated.
Figure 5:
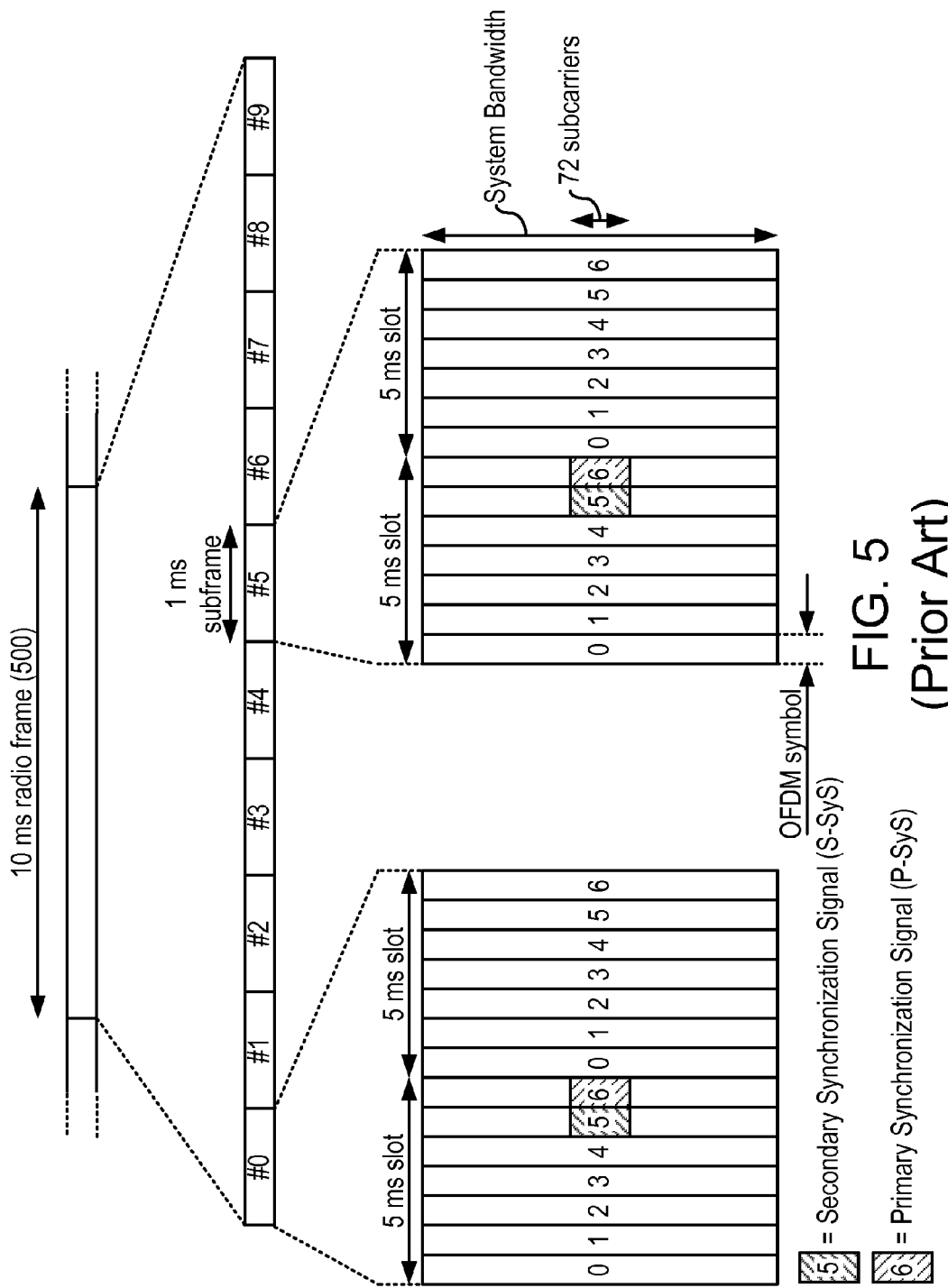
FIG. 5 illustrates the structure of the radio interface of an LTE system.
Figure 6A:
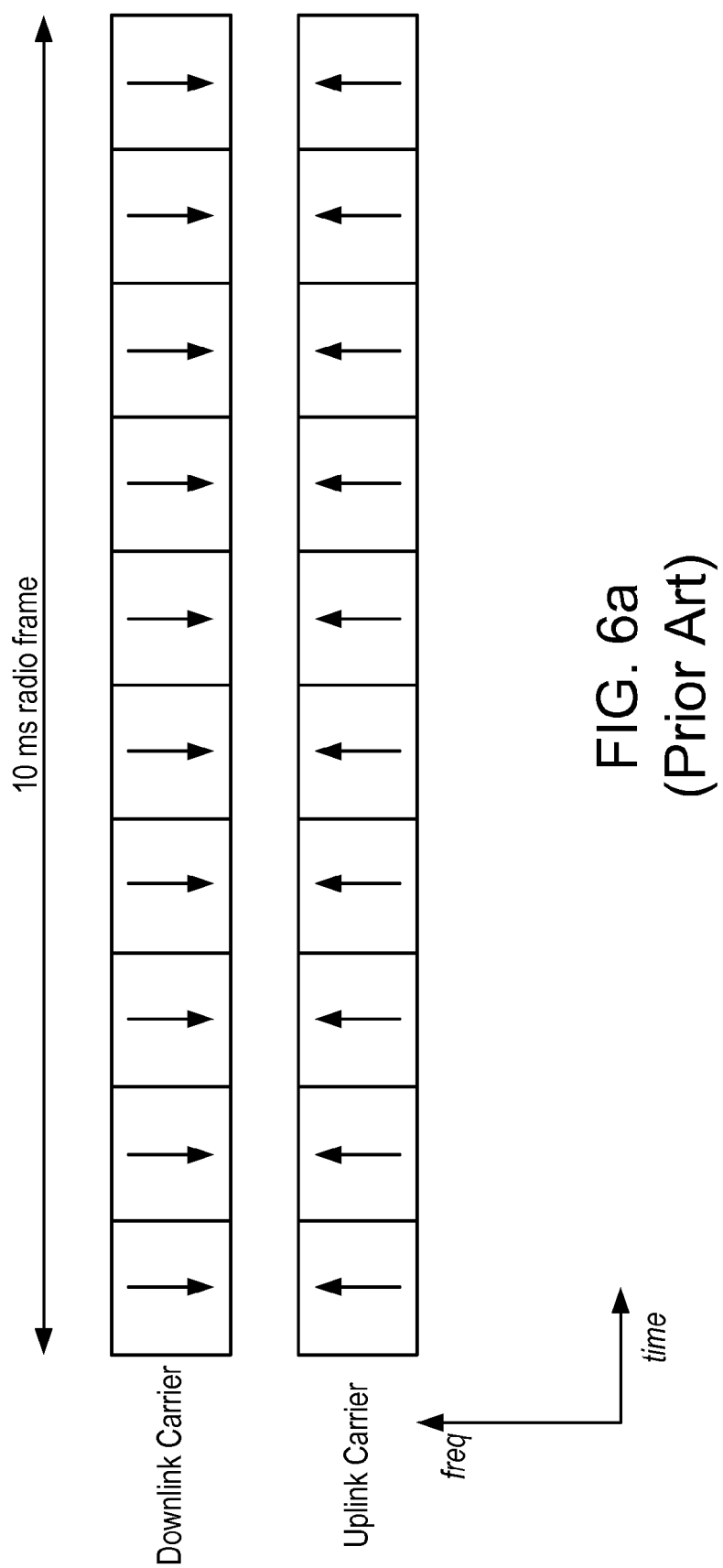
FIG. 6a illustrates a signal timing diagram for the case of FDD operation, wherein pairs of the radiofrequency spectrum are allocated to users, one part for uplink transmissions, and the other part for downlink transmissions.

In Column 3, Line 40, delete "FIGS. 3)," and insert -- FIG. 3), --, therefor.

In Column 10, Line 22, delete "unit 923" and insert -- unit 921 --, therefor.

Signed and Sealed this
Seventeenth Day of January, 2017

Michelle K. Lee
*Director of the United States Patent and Trademark Office*